US012735590B2

(12) United States Patent
Sato

(10) Patent No.: US 12,735,590 B2
(45) **Date of Patent: *Sep. 15, 2026**

(54) INKJET INK AND INKJET RECORDING APPARATUS

(71) Applicant: KYOCERA DOCUMENT SOLUTIONS INC., Osaka (JP)

(72) Inventor: Satoshi Sato, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 169 days.

This patent is subject to a terminal disclaimer.

(21) Appl. No.: 18/769,436

(22) Filed: Jul. 11, 2024

(65) Prior Publication Data

US 2025/0026943 A1 Jan. 23, 2025

(30) Foreign Application Priority Data

Jul. 13, 2023 (JP) ................................ 2023-115307

(51) Int. Cl.

| | |
|---|---|
| ***C09D 11/322*** | (2014.01) |
| ***B41J 2/155*** | (2006.01) |
| ***C09D 11/037*** | (2014.01) |
| ***C09D 11/107*** | (2014.01) |

(52) U.S. Cl.

CPC ............ *C09D 11/322* (2013.01); *B41J 2/155* (2013.01); *C09D 11/037* (2013.01); *C09D 11/107* (2013.01)

(58) Field of Classification Search

None

See application file for complete search history.

(56) References Cited

U.S. PATENT DOCUMENTS 12,384,929 B2 * 8/2025 Yoshii .................. C09D 11/322

FOREIGN PATENT DOCUMENTS

JP 2000273383 A * 10/2000

* cited by examiner

*Primary Examiner* — Joshua D Zimmerman

(74) *Attorney, Agent, or Firm* — Li & Cai Intellectual Property Office

(57) ABSTRACT

An inkjet ink includes: a quinacridone pigment; a pigment coating resin; and an aqueous medium. The pigment coating resin includes an adsorbed resin that is adsorbed on the quinacridone pigment and an unadsorbed resin that is not adsorbed on the quinacridone pigment. A ratio of the unadsorbed resin to the pigment coating resin is 18 mass % or more and 52 mass % or less. A phosphorus concentration in a supernatant liquid is 1.0 ppm or more and 12.5 ppm or less, the supernatant liquid being obtained by centrifuging the inkjet ink at 1,050,000 G for 3 hours. A sulfur concentration in the supernatant liquid is 1.0 ppm or more and 12.5 ppm or less. Absorbance of a first peak in an ultraviolet-visible light absorption spectrum of a 25-fold diluted solution of the supernatant liquid is 0.010 or less.

10 Claims, 4 Drawing Sheets

INKJET INK AND INKJET RECORDING APPARATUS

CROSS-REFERENCE TO RELATED PATENT APPLICATION

This application claims the benefit of Japanese Priority Patent Application JP 2023-115307 filed Jul. 13, 2023, the entire contents of which are incorporated herein by reference.

FIELD OF THE DISCLOSURE

The present disclosure relates to an inkjet ink and an inkjet recording apparatus.

BACKGROUND OF THE DISCLOSURE

Inkjet recording apparatuses eject inkjet inks from a recording head. The inkjet inks are desired to have excellent dispersion stability and ejection stability and to be capable of forming images with excellent abrasion resistance. Further, when the inkjet recording apparatus is used, the inkjet ink adhering to the ejection surface of the recording head dries, and pigments are fixed to the ejection surface of the recording head in some cases. In order to address this, the inkjet recording apparatus includes a cleaning member in some cases. The cleaning member wipes off the pigment fixed to the ejection surface of the recording head together with, for example, a cleaning solution or an inkjet ink purged from the recording head (hereinafter, referred to as a purge ink in some cases). From the viewpoint of reliably cleaning the ejection surface of the recording head by the cleaning member, the inkjet inks are also desired to have the ability that the pigment that has dried and been fixed to the ejection surface of the recording head is easily dissolved in the cleaning solution or purge ink (hereinafter, referred to as redissolvability in some cases).

In order to meet such a demand, for example, an inkjet recording liquid containing an aqueous pigment dispersion has been proposed (Japanese Patent Application Laid-open No. 2000-273383). This aqueous pigment dispersion includes an aqueous liquid, a quinacridone pigment dispersed in the aqueous liquid, a water-soluble quinacridone derivative adsorbed on the surface of the quinacridone pigment, and an unadsorbed water-soluble quinacridone derivative.

SUMMARY OF THE DISCLOSURE

However, the inkjet recording liquid disclosed in Japanese Patent Application Laid-open No. 2000-273383 is insufficient in at least one of the ejection stability, the dispersion stability, the redissolvability, and the abrasion resistance of a formed image.

In view of the circumstances as described above, it is desirable to provide an inkjet ink that has excellent ejection stability, dispersion stability, and redissolvability and is capable of forming images with excellent abrasion resistance, and an inkjet recording apparatus using this inkjet ink.

An inkjet ink according to the present disclosure includes: a quinacridone pigment; a pigment coating resin; and an aqueous medium. The pigment coating resin includes an adsorbed resin that is adsorbed on the quinacridone pigment and an unadsorbed resin that is not adsorbed on the quinacridone pigment. A ratio of the unadsorbed resin to the pigment coating resin is 18 mass % or more and 52 mass % or less. A phosphorus concentration in a supernatant liquid is 1.0 ppm or more and 12.5 ppm or less, the supernatant liquid being obtained by centrifuging the inkjet ink according to the present disclosure at 1,050,000 G for 3 hours. A sulfur concentration in the supernatant liquid is 1.0 ppm or more and 12.5 ppm or less. Absorbance of a first peak in an ultraviolet-visible light absorption spectrum of a 25-fold diluted solution of the supernatant liquid is 0.010 or less. The first peak is a maximum peak in a wavelength range of 400 nm or more and 450 nm or less.

An inkjet recording apparatus according to the present disclosure includes: a conveying unit that conveys a recording medium; and a recording head that ejects an ink to the recording medium. The ink is the inkjet ink according to the present disclosure.

The inkjet ink according to the present disclosure has excellent ejection stability, dispersion stability, and redissolvability and is capable of forming images with excellent abrasion resistance. The inkjet recording apparatus according to the present disclosure includes an inkjet ink that has excellent ejection stability, dispersion stability, and redissolvability, and is capable of forming images with excellent abrasion resistance.

These and other objects, features and advantages of the present disclosure will become more apparent in light of the following detailed description of best mode embodiments thereof, as illustrated in the accompanying drawings.

DETAILED DESCRIPTION OF THE EXEMPLARY EMBODIMENTS

Figure 1:
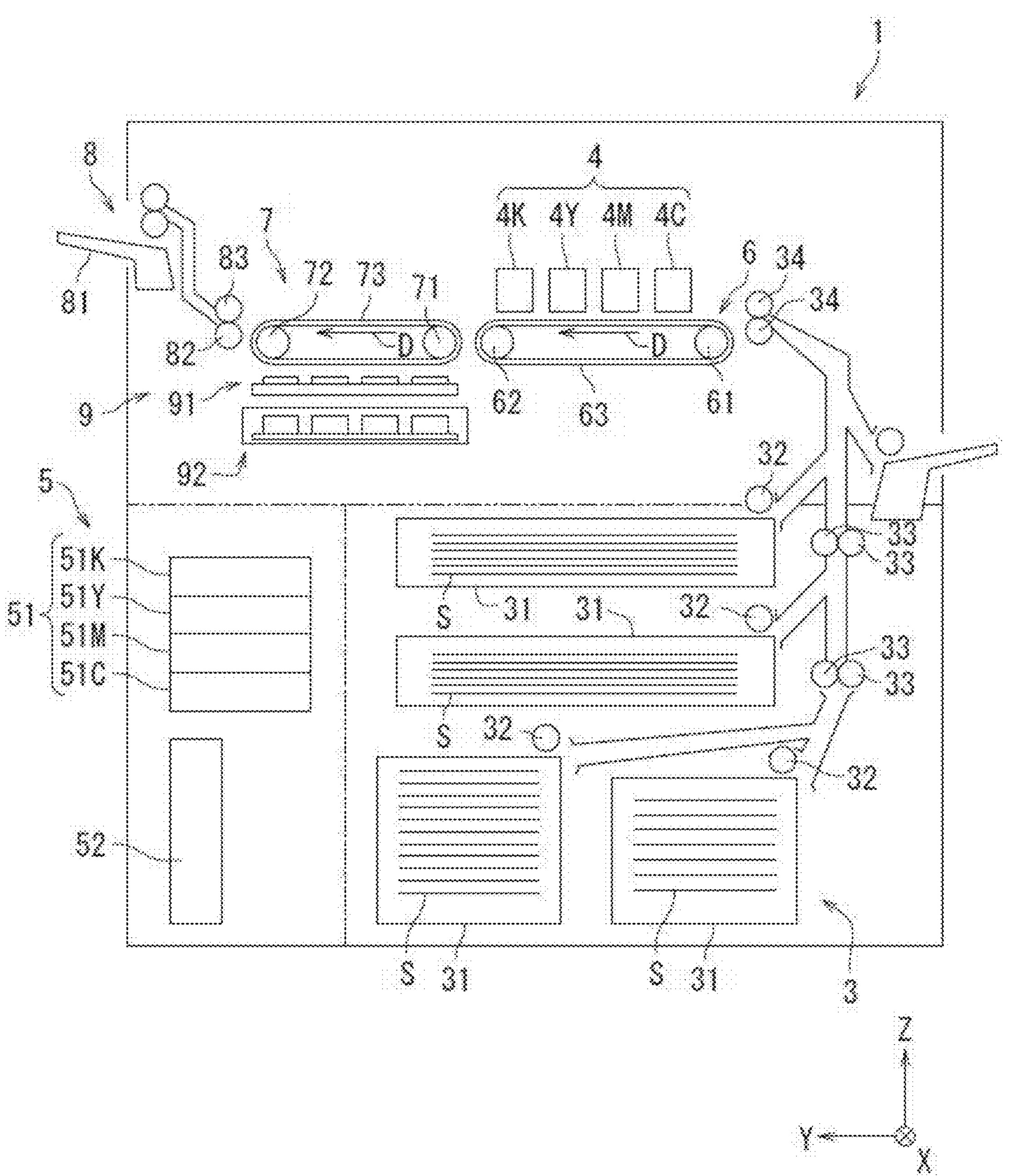
FIG. 1 is a diagram showing an example of an inkjet recording apparatus according to a second embodiment.

Embodiments of the present disclosure will be described below. First, terms used in the present specification will be described. Unless otherwise specified, the volume median diameter ($D_{50}$) is a value measured using a dynamic light scattering particle size distribution analyzer (e.g., "Zetasizer Nano ZS" manufactured by Malvern Panalytical Ltd.). Unless otherwise specified, the acid value is a value measured in accordance with "Japanese Industrial Standard (JIS) K0070:1992". Unless otherwise specified, the mass average molecular weight (Mw) is a value measured using gel permeation chromatography. Unless otherwise specified, the viscosity is a value measured in an environment of 25° C. in accordance with the method described in "Japanese Industrial Standard (JIS) Z 8803:2011 Methods for viscosity measurement of liquid". In the present specification, acrylic and methacrylic are collectively referred to as "(meth) acrylic" in some cases. The term "each independently" in the description of formulae mean that they may represent the same group or different groups. The components described in the present specification may each be used alone, or two or more of them may be used in combination.

First Embodiment: Inkjet Ink

A first embodiment of the present disclosure relates to an inkjet ink (hereinafter, referred to as an ink in some cases).

The ink according to this embodiment includes a quinacridone pigment, a pigment coating resin, and an aqueous medium. The pigment coating resin includes an adsorbed resin that is adsorbed on the quinacridone pigment and an unadsorbed resin that is not adsorbed on the quinacridone pigment. A ratio of the unadsorbed resin to the pigment coating resin is 18 mass % or more and 52 mass % or less. A phosphorus concentration in a supernatant liquid is 1.0 ppm or more and 12.5 ppm or less, the supernatant liquid being obtained by centrifuging the ink according to this embodiment at 1,050,000 G for 3 hours. A sulfur concentration in the supernatant liquid is 1.0 ppm or more and 12.5 ppm or less. Absorbance of a first peak (hereinafter, referred to as first absorbance in some cases) in an ultraviolet-visible light absorption spectrum of a 25-fold diluted solution of the supernatant liquid is 0.010 or less. The first peak is a maximum peak in a wavelength range of 400 nm or more and 450 nm or less.

Hereinafter, the ratio of the unadsorbed resin to the pigment coating resin will be referred to as an "unadsorbed resin ratio" in some cases. Further, the "sulfur concentration in the supernatant liquid obtained by centrifuging the ink at 1,050,000 G for 3 hours" is referred to as a "predetermined sulfur concentration" in some cases. Further, the "phosphorus concentration in the supernatant liquid obtained by centrifuging the ink at 1,050,000 G for 3 hours" is referred to as a "predetermined phosphorus concentration" in some cases.

By having the above configuration, the ink according to this embodiment has excellent ejection stability, dispersion stability, and redissolvability and is capable of forming images with excellent abrasion resistance. The reasons for this are presumed to be as follows.

First, in order to facilitate understanding, an overview of the method of synthesizing the quinacridone pigment will be described. The quinacridone pigment is, for example, a compound represented by the formula (2). The quinacridone pigment is synthesized by, for example, carrying out reactions represented by reaction formulae (r-a), (r-b), (r-c), and (r-1).

However, the aforementioned description for the composite nanometer material structure 2 of the first embodiment is merely an example, and is not meant to limit the scope of the present disclosure.

In the formulae (A), (B), (C), (1), and (2), $R^A$, $R^B$, $R^1$, and $R^2$ each independently represent a monovalent group. Hereinafter, the "reactions represented by the reaction formulae (r-a), (r-b), (r-c), and (r-1)" will be respectively referred to as "reactions (r-a), (r-b), (r-c), and (r-1)" in some cases. Further, the "compounds represented by the formulae (A), (B), (C), (1), and (2)" are respectively referred to as "compounds (A), (B), (C), (1), and (2)" in some cases. In the case where $R^1$ and $R^2$ each represent a methyl group, the compound (2) is C.I. Pigment Red 122. In the case where $R^1$ and $R^2$ each represent a hydrogen atom, the compound (2) is C.I. Pigment Violet 19.

In the process of carrying out the reactions (r-a), (r-b), and (r-c), the compound (A) is used as a raw material to sequentially generate the intermediate compounds (B), (C), and (1). Further, in the reaction (r-1), the compound (1) is reacted in the presence of a catalyst to obtain the compound (2). The catalyst used in the reaction (r-1) includes, for example, a phosphorus-containing catalyst. The above is the description of an overview of the method of synthesizing the quinacridone pigment.

The intermediates (more specifically, the compounds (B) and (C)) generated in the process of carrying out the reactions (r-a), (r-b), and (r-c), and the phosphorus-containing catalyst used in the reaction (r-1) remain in the quinacridone pigment as impurities in some cases. For this reason, known inks containing the quinacridone pigment include the intermediate and the phosphorus-containing catalyst in some cases.

Further, the quinacridone pigment is difficult to disperse in an aqueous medium. In order to address this, a sulfur compound (e.g., a derivative of a quinacridone pigment containing a sulfur atom) is added to the quinacridone pigment as a dispersant. Hereinafter, the "derivative of a quinacridone pigment containing a sulfur atom" will be referred to as a "sulfur-containing pigment derivative" in (Chem. 1)

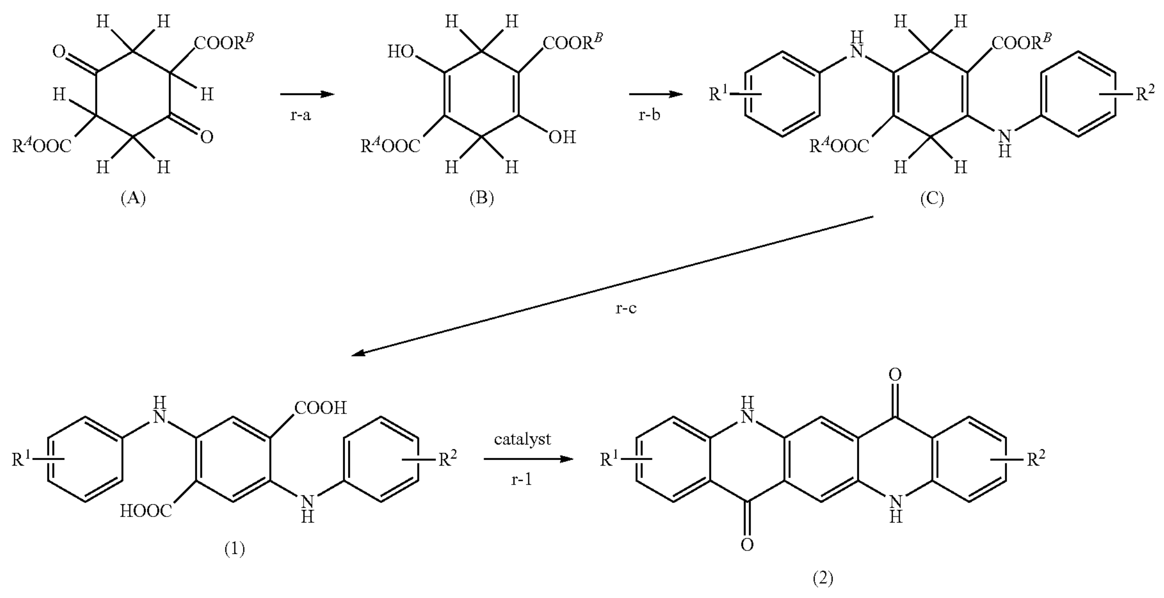

(A) (B) (C) (1) (2)

some cases. For this reason, known inks containing the quinacridone pigment inevitably include a sulfur compound in some cases.

Further, known inks include, for example, a pigment coating resin as well as the quinacridone pigment in order to dispersing the quinacridone pigment in the aqueous medium. Only part of the pigment coating resin included in the known inks is adsorbed on the quinacridone pigment, and the remainder is not adsorbed on the quinacridone pigment. Hereinafter, the pigment coating resin adsorbed on the quinacridone pigment will be referred to as an adsorbed resin in some cases. The adsorbed resin allows the quinacridone pigment to be dispersed in the aqueous medium. The pigment coating resin that is not adsorbed in the quinacridone pigment is referred to as an unadsorbed resin in some cases. The unadsorbed resin is, for example, free in the aqueous medium.

The polarity of each of the above phosphorus-containing catalyst and the above unadsorbed resin is relatively high. For this reason, in the case where an image is formed using known inks including the quinacridone pigment, the phosphorus-containing catalyst and the unadsorbed resin are electrostatically adhered to the ejection surface of the recording head and the inner wall of the nozzle hole. The phosphorus-containing catalyst and the unadsorbed resin adhered to the ejection surface of the recording head and the inner wall of the nozzle hole inhibits the stable ejection of the known inks from the recording head (decreases the ejection stability of the known inks).

On the other hand, in the ink according to this embodiment, the content of the phosphorus-containing catalyst that is an impurity is relatively small (predetermined phosphorus concentration is 12.5 ppm or less). For this reason, the ink according to this embodiment is capable of suppressing a decrease in the ejection stability caused by the phosphorus-containing catalyst. Meanwhile, the ink according to this embodiment contains, for example, a very small amount of a phosphorus compound (e.g., the phosphorus-containing catalyst) (predetermined phosphorus concentration is 1.0 ppm or more). The quinacridone pigment containing a small amount of a phosphorus compound (particularly, the phosphorus-containing catalyst) tends to be easily re-dissolved in the cleaning solution or purge ink when fixed to the ejection surface of the recording head. For this reason, by containing a very small amount of the above-mentioned phosphorus compound, the ink according to this embodiment is capable of exhibiting excellent redissolvability.

Further, in the ink according to this embodiment, the predetermined sulfur concentration is 1.0 ppm or more. The predetermined sulfur concentration is derived from, for example, a sulfur compound. The sulfur compound functions as a dispersant for reducing the diameters of pigment particles including the quinacridone pigment in the production of the ink according to this embodiment. The sulfur compound used in the production of the ink according to this embodiment is included in, for example, the pigment particles. In the production of the ink according to this embodiment, using more sulfur compounds reduces the diameters of the pigment particles and allows the pigment particles to be less likely to settle. For this reason, the dispersion stability can be optimized by setting the predetermined sulfur concentration to 1.0 ppm or more in the ink according to this embodiment. However, images including pigment particles with excessively small particle diameters tend to have low abrasion resistance. For this reason, in the ink according to this embodiment, the predetermined sulfur concentration is set to 12.5 ppm or less to prevent the diameters of the pigment particles from becoming excessively small. As a result, the ink according to this embodiment is capable of optimizing the abrasion resistance of a formed image.

Further, in the ink according to this embodiment, the unadsorbed resin ratio is 52 mass % or less. Known inks that contain a large amount of the unadsorbed resin tend to have lower ejection stability. Since the ink according to this embodiment has a relatively small amount of the unadsorbed resin, it is possible to exhibit excellent ejection stability. Meanwhile, the unadsorbed resin has the property of promoting the binding of the quinacridone pigment to the recording medium. In this regard, in the ink according to this embodiment, the unadsorbed resin ratio is a predetermined amount or more (unadsorbed resin ratio is 18 mass % or more). As a result, the ink according to this embodiment is capable of promoting the binding of the quinacridone pigment to the recording medium and further optimizing the abrasion resistance of a formed image.

Further, in the ink according to this embodiment, first absorbance in an ultraviolet-visible light absorption spectrum of a 25-fold diluted solution of a supernatant liquid is 0.010 or less. The first peak is, for example, a peak derived from an intermediate for synthesizing the quinacridone pigment (more specifically, the compounds (B) and (C), or the like). Since the ink according to this embodiment has the first absorbance of the supernatant liquid of 0.010 or less and the content of the intermediate that is an impurity is a relatively low, it is possible to suppress a decrease in the ejection stability caused by the intermediate.

As described above, the ink according to this embodiment has excellent ejection stability, dispersion stability, and redissolvability and is capable of forming images with excellent abrasion resistance, because the amounts of the unadsorbed resin, the sulfur compound, the phosphorus compound, the intermediate, and the like are optimized. The ink according to this embodiment will be described below in more detail.

<Predetermined Phosphorus Concentration>

First, the predetermined phosphorus concentration of the ink according to this embodiment will be described. As described above, the predetermined phosphorus concentration is 1.0 ppm or more and 12.5 ppm or less, favorably 1.5 ppm or more and 10.0 ppm or less, more favorably 3.5 ppm or more and 8.5 ppm or less, and still more favorably 5.5 ppm or more and 7.0 ppm or less. By setting the predetermined phosphorus concentration to 1.0 ppm or more, the ink according to this embodiment is capable of exhibiting excellent redissolvability. By setting the predetermined phosphorus concentration to 12.5 ppm or less, the ink according to this embodiment is capable of exhibiting excellent ejection stability.

The predetermined phosphorus concentration is, for example, the concentration of phosphorus atoms derived from the phosphorus-containing catalyst for synthesizing the quinacridone pigment. That is, the ink according to this embodiment includes, for example, the phosphorus-containing catalyst. In this case, the predetermined phosphorus concentration is, for example, the concentration of phosphorus atoms contained in the phosphorus-containing catalyst included in the supernatant liquid.

The above phosphorus-containing catalyst is, for example, at least one selected from the group consisting of polyphosphoric acid and a polyphosphoric acid derivative. Therefore, more specifically, the predetermined phosphorus concentration is the concentration of phosphorus atoms contained in the at least one selected from the group consisting of polyphosphoric acid and a polyphosphoric acid derivative. Hereinafter, the "at least one selected from the group consisting of polyphosphoric acid and a polyphosphoric acid derivative" will be referred to as "polyphosphoric acids" in some cases.

Examples of the polyphosphoric acid derivative include polyphosphoric acid ester, more specifically, polyphosphoric acid alkylester. As the polyphosphoric acid alkylester, polyphosphoric acid methylester. The catalyst used in the above reaction (r-1) may further include a metal catalyst such as tin, in addition to the phosphorus-containing catalyst.

At least part of the phosphorus-containing catalyst remaining in the quinacridone pigment is removed by, for example, ultrafiltration, and thus, the predetermined phosphorus concentration is reduced. For example, the predetermined phosphorus concentration can be adjusted by changing the circulation time of a pigment dispersion liquid during ultrafiltration of the pigment dispersion liquid. The longer the circulation time of the pigment dispersion liquid, the lower the predetermined phosphorus concentration tends to be. The predetermined phosphorus concentration is measured by, for example, the method described in Examples. The above is the description of the predetermined phosphorus concentration of the ink according to this embodiment.

Next, the components included in the ink according to this embodiment will be described. The ink according to this embodiment includes at least a quinacridone pigment, a pigment coating resin, and an aqueous medium. The ink according to this embodiment further includes, for example, a sulfur compound. In the ink according to this embodiment, the sulfur compound constitutes a pigment composition together with, for example, the quinacridone pigment. The ink according to this embodiment may further include a surfactant and a different component, as necessary. The pigment composition, the pigment coating resin, the aqueous medium, the surfactant, and the different component will be described below.

<Pigment Composition>

The pigment composition includes the quinacridone pigment and the sulfur compound. The quinacridone pigment and the sulfur compound will be described below.

(Quinacridone Pigment)

Examples of the quinacridone pigment include C.I. Pigment Violet (19 and 42), C.I. Pigment Red (122, 202, 206, 207, and 209), and C.I. Pigment Orange (48 and 49).

Examples of commercial products that can be used as the quinacridone pigment include "TRM-11" manufactured by Dainichiseika Color & Chemicals Mfg.Co., Ltd., "Cinquasia (registered trademark) Magenta D4550" manufactured by BASF SE, "Cinquasia (registered trademark) Pink D4450" manufactured by BASF SE, "Inkjet Magenta E-S" manufactured by Clariant AG, "HOSTAPERM PINK E 02" manufactured by Clariant AG, "HOSTAPERM RED E3B" manufactured by Clariant AG, and "HOSTAPERM RED E5B 02" manufactured by Clariant AG.

The content ratio of the quinacridone pigment in the ink according to this embodiment is favorably 1.0 mass % or more and 12.0 mass % or less, more favorably 4.0 mass % or more and 8.0 mass % or less. By setting the content ratio of the quinacridone pigment to 1.0 mass % or more, it is possible to form an image with desired image density using the ink according to this embodiment. By setting the content ratio of the quinacridone pigment to 12.0 mass % or less, the fluidity of the ink according to this embodiment can be optimized. The ink according to this embodiment may include only the quinacridone pigment as a pigment. Further, in order to adjust the hue of the ink according to this embodiment, the ink according to this embodiment may further include, as a pigment, a pigment other than the quinacridone pigment, in addition to the quinacridone pigment. The content ratio of the quinacridone pigment in the pigment is favorably 80 mass % or more, more favorably 90 mass % or more, and particularly favorably 100 mass %.

(Sulfur Compound)

The sulfur compound is adsorbed on the quinacridone pigment to disperse the quinacridone pigment in the aqueous medium. The predetermined sulfur concentration is, for example, the concentration of sulfur atoms contained in the sulfur compound (e.g., the sulfur-containing pigment derivative, more specifically, the sulfur compound represented by the formula (1) described below).

As described above, the predetermined sulfur concentration is 1.0 ppm or more and 12.5 ppm or less, favorably 1.0 ppm or more and 10.0 ppm or less, more favorably 1.2 ppm or more and 5.0 ppm or less, and still more favorably 1.2 ppm or more and 2.5 ppm or less. By setting the predetermined sulfur concentration to 1.0 ppm or more, the ink according to this embodiment is capable of exhibiting excellent redissolvability. By setting the predetermined sulfur concentration to 12.5 ppm or less, the ink according to this embodiment is capable of forming images with excellent abrasion resistance.

For example, by changing the content ratio of the sulfur compound to the total mass of the quinacridone pigment and the sulfur compound, the predetermined sulfur concentration can be adjusted. The lower the content ratio of the sulfur compound to the total mass of the quinacridone pigment and the sulfur compound, the lower the predetermined sulfur concentration tends to be. The content ratio of the sulfur compound to the total mass of the quinacridone pigment and the sulfur compound is favorably within a range similar to that of the content ratio of the sulfur-containing pigment derivative (1) to the total mass of the quinacridone pigment and the sulfur-containing pigment derivative (1) described below. The predetermined sulfur concentration is measured by, for example, the method described in Examples.

The sulfur compound is, for example, a sulfur-containing pigment derivative. The sulfur-containing pigment derivative has, for example, a sulfur-containing group. Examples of the sulfur-containing group include a sulfo group, a sulfino group, a sulfeno group, a thiocarboxy group, a dithiocarboxy group, and a sulfide group. The sulfur-containing pigment derivative is, for example, a compound obtained by substituting a hydrogen atom contained in the quinacridone pigment exemplified above with a sulfur-containing group.

The sulfur-containing pigment derivative is favorably a metal salt. When the sulfur-containing pigment derivative is a metal salt, the affinity of sulfur-containing pigment derivative for the aqueous medium increases. As a result, the quinacridone pigment on which the sulfur-containing pigment derivative is adsorbed disperses well in the aqueous medium. As the sulfur-containing pigment derivative that is a metal salt, the sulfur compound represented by the formula (1) (hereinafter, referred to as a sulfur-containing pigment derivative (1) in some cases) is favorable. That is, the ink according to this embodiment favorably includes the sulfur-containing pigment derivative (1).

(Chem. 2)

(1)

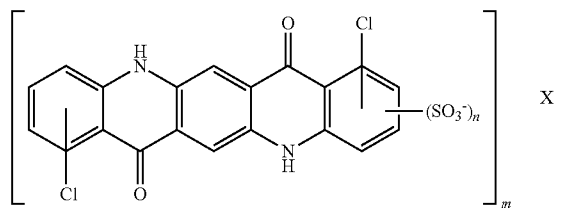

In the formula (1), n represents an integer of 1 or more and 3 or less, m represents an integer of 1 or more and 3 or less, and X represents a metal ion.

In the formula (1), n favorably represents 2 or 3. m favorably represents 1. X in the formula (1) favorably represents a mono- to tri-metal ion, more favorably a divalent or trivalent metal ion, and still more favorably $Al^{3+}$ or $Mg^{2+}$.

Examples of the sulfur-containing pigment derivative (1) include sulfur compounds represented by formulae (1-1) and (1-2) (hereinafter, respectively referred to as sulfur-containing pigment derivatives (1-1) and (1-2) in some cases). Note that m in the formulae (1-1) and (1-2) represents 1, which is omitted.

(Chem. 3)

(1-1)

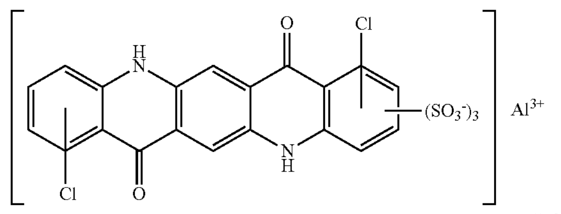

(1-2)

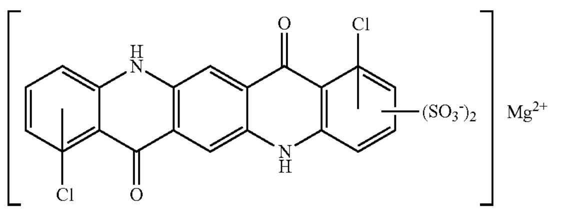

The content ratio of the sulfur-containing pigment derivative (1) to the total mass of the quinacridone pigment and the sulfur-containing pigment derivative (1) is favorably 4 mass % or more and 12 mass % or less, more favorably 4 mass % or more and 6 mass % or less. Hereinafter, the "content ratio of the sulfur-containing pigment derivative (1) to the total mass of the quinacridone pigment and the sulfur-containing pigment derivative (1)" will be referred to as a "derivative content ratio" in some cases. When the derivative content ratio is 4 mass % or more and 12 mass % or less, the predetermined sulfur concentration can be easily adjusted to a value within a desired range. The lower the derivative content ratio, the lower the predetermined sulfur concentration tends to be.

The content ratio of the sulfur-containing pigment derivative in the ink according to this embodiment is favorably 0.03 mass % or more and 0.60 mass % or less, more favorably 0.12 mass % or more and 0.40 mass % or less.

<Pigment Coating Resin>

The pigment coating resin includes an adsorbed resin and an unadsorbed resin. The adsorbed resin is adsorbed on the quinacridone pigment. The quinacridone pigment constitutes pigment particles together with, for example, the adsorbed resin. The pigment particles each include, for example, a core including the quinacridone pigment and a coating layer coating the core. The coating layer includes the adsorbed resin. Since the pigment coating resin is hydrophilic, the adsorbed resin adsorbed on the surface of the quinacridone pigment disperses the quinacridone pigment in the aqueous medium. Meanwhile, the unadsorbed resin is not adsorbed on the quinacridone pigment. The unadsorbed resin is free in the aqueous medium.

As described above, the unadsorbed resin ratio is 18 mass % or more and 52 mass % or less, favorably 25 mass % or more and 45 mass % or less, more favorably 25 mass % or more and 35 mass % or less. By setting the unadsorbed resin ratio to 18 mass % or more, the ink according to this embodiment is capable of forming images with excellent abrasion resistance. By setting the unadsorbed resin ratio to 52 mass % or less, the ink according to this embodiment is capable of exhibiting excellent ejection stability.

The unadsorbed resin ratio can be measured by centrifuging the ink according to this embodiment using a centrifuge. The unadsorbed resin ratio can be calculated from the formula "unadsorbed resin ratio=100× mass of unadsorbed resin/total mass of pigment coating resin=100× mass of unadsorbed resin/(mass of unadsorbed resin+mass of adsorbed resin)". For example, the higher the ejection rate of a wet disperser in the process of preparing pigment dispersion liquid described below, the higher the unadsorbed resin ratio tends to be.

In the ink according to this embodiment, the first absorbance is 0.010 or less, favorably 0.005 or less, more favorably 0.002 or less. Note that the first absorbance is, for example, 0.001 or more. By setting the first absorbance to 0.010 or less, the ink according to this embodiment is capable of exhibiting excellent ejection stability.

In the ultraviolet-visible light absorption spectrum of the supernatant liquid obtained by centrifuging the ink according to this embodiment at 1,050,000 G for 3 hours, the absorbance of a second peak is favorably 0.15 or more and 0.40 or less. In the present specification, the second peak is the maximum peak within the wavelength range of 300 nm or more and 350 nm or less. Hereinafter, the absorbance of the second peak in the ultraviolet-visible light absorption spectrum of the supernatant liquid obtained by centrifuging the ink according to this embodiment at 1,050,000 G for 3 hours" will be referred to as "second absorbance" in some cases.

The second peak is, for example, a peak derived from the unadsorbed resin. When the second absorbance is 0.15 or more and 0.40 or less, the unadsorbed resin ratio can be easily adjusted to a value within a desired range. As a result, the ink according to this embodiment is capable of further optimizing the abrasion resistance of a formed image while further optimizing the ejection stability. In particular, when the second absorbance is 0.15 or more, the ink according to this embodiment is capable of forming images with further excellent abrasion resistance. When the second absorbance is 0.40 or less, the ejection stability of the ink according to this embodiment can be further optimized. The second absorbance is more favorably 0.18 or more and 0.32 or less, still more favorably 0.18 or more and 0.25 or less.

For example, by changing the unadsorbed resin ratio, the second absorbance can be adjusted. The higher the unadsorbed resin ratio, the higher the second absorbance tends to be. The second peak appears at, for example, a wavelength of 320 nm. The second absorbance can be measured by, for example, the method described in Examples.

In order to further optimize the ejection stability and the dispersion stability of the ink according to this embodiment, the ratio of the pigment coating resin to the quinacridone pigment (hereinafter, referred to as a "resin/pigment ratio" in some cases) is favorably 0.30 or more and 0.50 or less, more favorably 0.35 or more and 0.42 or less. The resin/pigment ratio can be calculated from the formula "resin/pigment ratio=mass of pigment coating resin/mass of pigment". The mass of the pigment coating resin is the total mass of the adsorbed resin and the unadsorbed resin.

In order to further optimize the ejection stability of the ink according to this embodiment, the acid value of the pigment coating resin is favorably 60 mgKOH/g or more and 300 mgKOH/g or less, more favorably 80 mgKOH/g or more and 120 mgKOH/g or less, and still more favorably 90 mgKOH/g or more and 110 mgKOH/g or less. Further, when the acid value of the pigment coating resin is 60 mgKOH/g or more, the pigment particles disperse well in the aqueous medium, and images with excellent color development and coloration power can be formed. Meanwhile, when the acid value of the pigment coating resin is 300 mgKOH/g or less, the preservation stability of the ink according to this embodiment can be optimized.

In order to optimize the viscosity of the ink according to this embodiment, the mass average molecular weight of the pigment coating resin is favorably 10000 or more and 50000 or less, more favorably 15000 or more and 30000 or less.

Examples of the pigment coating resin include a (meth) acrylic resin, a styrene-(meth)acrylic resin, a styrene-maleic acid resin, and a urethane resin. From the viewpoint of stably dispersing the quinacridone pigment, a styrene-(meth) acrylic resin is favorable as the pigment coating resin.

The styrene-(meth)acrylic resin includes, as repeating units, at least one of a first repeating unit derived from a styrene monomer, a second repeating unit derived from (meth)acrylic acid, or a third repeating unit derived from (meth)acrylic acid ester.

The styrene monomer is styrene or a derivative thereof. Examples of the styrene monomer include styrene, α-methylstyrene, and vinyltoluene. As the styrene monomer, styrene is favorable. The content ratio of the first repeating unit to all repeating units of the pigment coating resin is favorably 25.0 mass % or more and 60.0 mass % or less, more favorably 25.0 mass % or more and 30.0 mass % or less.

Examples of the (meth)acrylic acid monomer include acrylic acid and methacrylic acid. The (meth)acrylic acid monomer favorably includes methacrylic acid. The content ratio of the second repeating unit to all repeating units of the pigment coating resin is favorably 4.5 mass % or more and 10.0 mass % or less, more favorably 7.0 mass % or more and 9.0 mass % or less.

Examples of the (meth)acrylic acid ester include (meth) acrylic acid alkylester. As the (meth)acrylic acid alkylester, (meth)acrylic acid alkylester having 1 or more and 8 or less carbon atoms in an alkyl group is favorable, (meth)acrylic acid alkylester having 1 or more and 4 or less carbon atoms in an alkyl group is more favorable, methyl (meth)acrylate or butyl (meth)acrylate is still more favorable, and methyl methacrylate or butyl acrylate is particularly favorable. The content ratio of the third repeating unit to all repeating units of the pigment coating resin is favorably 35.0 mass % or more and 70.0 mass % or less, more favorably 50.0 mass % or more and 70.0 mass % or less. In the case where the pigment coating resin includes two or more types of third repeating units, the content ratio of the third repeating unit is the total content ratio of the two or more types of third repeating units.

As the pigment coating resin, a resin that includes at least one type of second repeating unit, at least one type of third repeating unit, and the first repeating unit is favorable. As the pigment coating resin, a resin that includes a repeating unit derived from (meth)acrylic acid, a repeating unit derived from methyl (meth)acrylate, a repeating unit derived from butyl (meth)acrylate, and a repeating unit derived from styrene is more favorable. As the pigment coating resin, a resin that includes a repeating unit derived from methacrylic acid, a repeating unit derived from methyl methacrylate, a repeating unit derived from butyl acrylate, and a repeating unit derived from styrene is still more favorable. The pigment coating resin may include, as a repeating unit, only these repeating units or may further include a repeating unit other than these repeating unit.

The content ratio of the pigment coating resin in the ink according to this embodiment is favorably 0.5 mass % or more and 8.0 mass % or less, more favorably 1.5 mass % or more and 4.0 mass % or less. By setting the content ratio of the pigment coating resin to 0.5 mass % or more, it is possible to effectively suppress the aggregation of the quinacridone pigment. By setting the content ratio of the pigment coating resin to 8.0 mass % or less, it is possible to effectively suppress clogging of the nozzle of the recording head.

<Aqueous Medium>

The aqueous medium included in the ink according to this embodiment is a medium containing water. The aqueous medium may function as a solvent or a dispersion medium. Specific examples of the aqueous medium include an aqueous medium containing water and a water-soluble organic solvent.

Examples of the water-soluble organic solvent include a glycol compound, a triol compound, a glycolether compound, a lactam compound, a nitrogen-containing compound, an acetate compound, γ-butyrolactone, thiodiglycol, and dimethylsulfoxide.

Examples of the glycol compound include ethylene glycol, 1,3-propanediol, propylene glycol, 1,3-butanediol, 1,2-pentanediol, 1,5-pentanediol, 1,2-hexanediol, 1,2-octanediol, 1,8-octanediol, 3-methyl-1,3-butanediol, 3-methyl-1,2-pentanediol, 3-methyl-1,5-pentanediol, 2,4-diethyl-1,5-pentanediol, 2-butyl-2-ethyl-1,3-propanediol, diethylene glycol, dipropylene glycol, trimethylene glycol, triethylene glycol, tripropylene glycol, tetraethylene glycol, 2-ethyl-1,2-hexanediol, and thiodiglycol. As the glycol compound, 3-methyl-1,5-pentanediol is favorable.

Examples of the triol compound include glycerin, 1,2,3-butanetriol, and 1,2,6-hexanetriol. As the triol compound, glycerin is favorable.

Examples of the glycolether compound include alkylene glycol alkylether, more specifically, diethylene glycol diethylether, diethylene glycol monoethylether, diethylene glycol monobutylether, ethylene glycol monomethylether, ethylene glycol monobutylether, diethylene glycol monomethylether, diethylene glycol monoethylether, diethylene glycol diethylether, triethylene glycol monomethylether, triethylene glycol monoethylether, triethylene glycol monobutylether, and propylene glycol monomethylether. As the glycolether compound, triethylene glycol monobutylether is favorable.

Examples of the lactam compound include 2-pyrrolidone and N-methyl-2-pyrrolidone. As the lactam compound, 2-pyrrolidone is favorable.

Examples of the nitrogen-containing compound include 1,3-dimethylimidazolidinone, formamide, and dimethylformamide.

Examples of the acetate compound include diethylene glycol monoethylether acetate.

As the water-soluble organic solvent, a glycolether compound, a glycol compound, or glycerin is favorable. As the aqueous medium, a mixed solvent of water, triethylene glycol monobutylether, 3-methyl-1,5-pentanediol, and glycerin is favorable.

The content ratio of the aqueous medium in the ink according to this embodiment is favorably 60.0 mass % or more and 95.0 mass % or less, more favorably 80.0 mass % or more and 95.0 mass % or less. The content ratio of water in the ink according to this embodiment is favorably 40.0 mass % or more and 80.0 mass % or less, more favorably 55.0 mass % or more and 70.0 mass % or less. The content ratio of the glycolether compound in the ink according to this embodiment is favorably 1.0 mass % or more and 10.0 mass % or less, more favorably 3.0 mass % or more and 5.0 mass % or less. The content ratio of the glycol compound in the ink according to this embodiment is 5.0 mass % or more and 35.0 mass % or less, more favorably 15.0 mass % or more and 25.0 mass % or less. The content ratio of glycerin in the ink according to this embodiment is favorably 2.0 mass % or more and 11.0 mass % or less, more favorably 4.0 mass % or more and 6.0 mass % or less.

<Surfactant>

The surfactant optimizes the compatibility and dispersion stability of each component included in the ink according to this embodiment. Further, the surfactant optimizes the permeability of the ink according to this embodiment to the recording medium. As the surfactant, a nonionic surfactant is favorable.

Examples of the nonionic surfactant include acetylenediol and an ethylene oxide adduct of acetylenediol. Examples of acetylenediol include 2,4,7,9-tetramethyl-5-decyne-4,7-diol, 3,6-dimethyl-4-octyne-3,6-diol, 3,5-dimethyl-1-hexyne-3-ol, and 2,4-dimethyl-5-hexyne-3-ol. As the nonionic surfactant, an ethylene oxide adduct of acetylenediol or an ethylene oxide adduct of acetylene glycol is favorable. The HLB value of the nonionic surfactant is favorably 4 or more and 14 or less, more favorably 4 or more and 8 or less or 10 or more and 14 or less. The content ratio of the surfactant in the ink according to this embodiment is favorably 0.01 mass % or more and 1.0 mass % or less, more favorably 0.1 mass % or more and 0.5 mass % or less.

<Different Component>

The ink according to this embodiment may include, as necessary, known additives (more specifically, a dissolution stabilizer, an anti-drying agent, an antioxidant, a viscosity adjustor, a pH adjuster, a neutralizer, an antifungal agent, and the like). Note that the ink according to this embodiment does not necessarily need to include known additives.

<Favorable Composition>

A favorable composition of the ink according to this embodiment is shown below. In the following, the pigment composition is favorably a mixture of the quinacridone pigment and the sulfur-containing pigment derivative (1), more favorably a mixture of the quinacridone pigment and the sulfur-containing pigment derivative (1-1) or a mixture of the quinacridone pigment and the sulfur-containing pigment derivative (1-2).

Pigment composition: 5.0 mass % or more and 7.0 mass % or less

Pigment coating resin: 2.0 mass % or more and 3.0 mass % or less

Triethylene glycol monobutylether: 3.0 mass % or more and 5.0 mass % or less 3-methyl-1,5-pentanediol: 19.0 mass % or more and 21.0 mass % or less Glycerin: 4.0 mass % or more and 6.0 mass % or less Surfactant: 0.3 mass % or more and 0.7 mass % or less Water: remaining amount <Method of Synthesizing Quinacridone Pigment>

Although an overview of the method of synthesizing the quinacridone pigment has been described above, an example of the method of synthesizing the quinacridone pigment will be described below in more detail. In the method of synthesizing the quinacridone pigment, it is favorable to thoroughly clean tools to be used for synthesizing in advance. This removes residues (particularly, the phosphorus-containing catalyst) remaining in each tool and allows the amount of the phosphorus-containing catalyst remaining in the quinacridone pigment obtained by synthesis to be reduced.

Examples of the monovalent group represented by $R^A$ and $R^B$ in the above-mentioned formulae (A), (B), and (C) include an alkyl group and an aryl group. As the monovalent group represented by $R^A$ and $R^B$, an alkyl group is favorable, an alkyl group having 1 or more and 6 or less carbon atoms is more favorable, and an ethyl group is still more favorable.

Examples of the monovalent group represented by $R^1$ and $R^2$ in the above-mentioned formulae (C), (1), and (2) include a hydrogen atom, an alkyl group, and a halogen atom. As the halogen atom represented by $R^1$ and $R^2$, a chlorine atom is favorable. As the alkyl group represented by $R^1$ and $R^2$, an alkyl group having 1 or more and 6 or less carbon atoms is favorable, and a methyl group is more favorable.

In the reaction (r-a), the compound (B) is obtained from the compound (A). Subsequently, in the reaction (r-b), 1 molar equivalent of compound (B) and 2 molar equivalents of aniline derivative are reacted with each other to obtain 1 molar equivalent of compound (C). Subsequently, in the reaction (r-c), the compound (C) is oxidized to obtain an oxide of the compound (C). Subsequently, the oxide of the compound (C) is hydrolyzed to obtain a compound (1).

Subsequently, in the reaction (r-1), the compound (1) is reacted in the presence of a catalyst to obtain the compound (2). The catalyst reaction (r-1) is a dehydration ring-closure reaction. For example, in the reaction (r-1), the compound (1) is pressure-heated at a first predetermined temperature for a predetermined time in the presence of the catalyst (e.g., a phosphorus-containing catalyst, more specifically, polyphosphoric acid). The first predetermined temperature is, for example, 85° C. or more and 200° C. or less. The predetermined time is, for example, 1 hour or more and 3 hours or less. In the reaction (r-1), in addition to the compound (1) and the catalyst, an organic solvent such as acetone may be further used. Further, instead of the compound (1), an alkali salt obtained by saponifying the compound (1) may be used in the reaction (r-1). Further, instead of the compound (1), the oxide of the above-mentioned compound (C) may be used in the reaction (r-1).

After the reaction (r-1), the compound (2) can be subjected to alkali treatment as necessary to obtain a β-type quinacridone pigment. The alkali treatment can be performed by, for example, heating the wet cake of the compound (2) and alkali at a second predetermined temperature using an autoclave. The second predetermined temperature is, for example, 120° C. or more and 200° C. or less. An organic solvent may be further used in the alkali treatment. Examples of the organic solvent that can be used in the alkali treatment include N,N-dimethylformamide and glycol.

In the method of synthesizing the quinacridone pigment by the reaction (r-1), it is unnecessary to desorb a sulfonic acid group or a sulfonic acid chloride group remaining in the generated quinacridone pigment using sulfuric acid, as compared with the synthesis method using an acid having a sulfonic acid group as a ring-closure agent. Therefore, the method of synthesizing the quinacridone pigment by the reaction (r-1) can be easily performed.

<Method of Preparing Pigment Composition>

An example of the method of preparing the pigment composition will be described below. The method of preparing the pigment composition includes, for example, a solvent treatment process (hereinafter, referred to as a process A in some cases), and a post-treatment process (hereinafter, referred to as a process B in some cases). The sulfur-containing pigment derivative is added in the process B. As necessary, the sulfur-containing pigment derivative may be added in the process A in addition to the process B.

(Process a in Process of Preparing Pigment Composition)

In the process A, the quinacridone pigment is treated with a solvent. Examples of the method of treating the quinacridone pigment include a method of kneading a quinacridone pigment and a solvent using a kneader (e.g., a salt milling kneader). In the process A, crystal growth of the quinacridone pigment and micronization of the quinacridone pigment are promoted. By promoting the micronization of the quinacridone pigment, the colorability and saturation of the quinacridone pigment are optimized. The temperature and time for treating the quinacridone pigment are not particularly limited, and only need to be set appropriately to achieve a desired particle diameter and granularity distribution of the quinacridone pigment. In the process A, the sulfur-containing pigment derivative may be added as necessary. Further, in the process A, an inorganic base (more specifically, sodium hydroxide, and potassium hydroxide) may be added as a grinding aid as necessary. A kneaded product of the quinacridone pigment obtained in the process A is washed with water or a solvent as necessary to obtain, for example a wet cake shape.

(Process B in Process of Preparing Pigment Composition)

In the process B, a kneaded product of the quinacridone pigment obtained in the process A is post-treated. Examples of the post-treatment method include a method of removing the solvent from the kneaded product of the quinacridone pigment to separate the pigment composition. Examples of the method of separating the pigment composition include filtration, drying, and distillation of a solvent using a rotary evaporator. In the case where the solvent is distilled off, the temperature for distilling off the solvent is, for example, a temperature of the boiling point of the solvent or more. The separated pigment composition may be pulverized, as necessary.

In the process B, the sulfur-containing pigment derivative is added. In the process B, the aggregation of the quinacridone pigment is suppressed, and both the dispersibility and preservation stability of the quinacridone pigment can be achieved. The sulfur-containing pigment derivative may be added at the start of the process of separating the pigment composition from the kneaded product or during the separation process. The mass of the sulfur-containing pigment derivative added in the process B (in the case where the sulfur-containing pigment derivative is added in the process A in addition to the process B, the total mass of the sulfur-containing pigment derivatives added in the process A and the process B) is favorably 0.5 parts by mass or more and 15 parts by mass or less, more favorably 1 part by mass or more and 10 parts by mass or less, still more favorably 3 parts by mass or more and 6 parts by mass or less, and still more favorably 3 parts by mass or more and 5 parts by mass or less to 100 parts by mass of the quinacridone pigment. When the mass of the sulfur-containing pigment derivative is 0.5 parts by mass or more and 15 parts by mass or less to 100 parts by mass of the quinacridone pigment, the hue of the quinacridone pigment is optimized. When the mass of the sulfur-containing pigment derivative is 3 parts by mass or more and 6 parts by mass or less to 100 parts by mass of the quinacridone pigment, the predetermined sulfur concentration can be easily adjusted to a value within a desired range.

In the case where the sulfur-containing pigment derivative is added in the process A in addition to the process B, the type of sulfur-containing pigment derivative added in the process B may be the same as or different from the type of sulfur-containing pigment derivative added in the process A. Further, in the case where the sulfur-containing pigment derivative is added in the process A in addition to the process B, the mass of the sulfur-containing pigment derivative added in the process B is favorably equal to or greater than the mass of the sulfur-containing pigment derivative added in the process A, from the viewpoint of optimizing the colorability of the quinacridone pigment.

<Method of Producing Ink>

An example of the method of producing the ink according to this embodiment will be described below. The method of producing the ink according to this embodiment includes, for example, a process of preparing a pigment dispersion liquid, an ultrafiltration process, and a mixing process.

(Process of Preparing Pigment Dispersion Liquid)

In the process of preparing a pigment dispersion liquid, the pigment composition including the quinacridone pigment, the pigment coating resin, and the aqueous medium are mixed to obtain a pigment dispersion liquid. In order to sufficiently disperse pigment particles, the pigment dispersion liquid may further include a surfactant. In the pigment dispersion liquid, $D_{50}$ of the pigment particles including the quinacridone pigment and the pigment coating resin is favorably 70 nm or more and less than 135 nm, more favorably 110 nm or more and less than 135 nm.

The content ratio of the quinacridone pigment in the pigment dispersion liquid is favorably 5.0 mass % or more and 25.0 mass % or less, more favorably 10.0 mass % or more and 20.0 mass % or less. The content ratio of the pigment coating resin in the pigment dispersion liquid is favorably 2.0 mass % or more and 10.0 mass % or less, more favorably 4.0 mass % or more and 8.0 mass % or less. In the case where the pigment dispersion liquid includes a surfactant, the content ratio of the surfactant in the pigment dispersion liquid is favorably 0.1 mass % or more and 2.0 mass % or less, more favorably 0.3 mass % or more and 1.0 mass % or less.

The pigment dispersion liquid can be prepared by wet dispersing the component included in the above pigment dispersion liquid using a media-type wet disperser. Examples of the media-type wet disperser include a bead mill (more specifically, "nano grain mill" manufactured by ASADA IRON WORKS.CO.,LTD., "MSC mill" manufactured by NIPPON COKE & ENGINEERING. CO., LTD., and "DYNO (registered trademark) mill" manufactured by Willy A Bachofen AG).

In the wet dispersion using the media-type wet disperser, for example, small beads (e.g., beads each having a diameter of 0.5 mm or more and 1.0 mm or less) are used as media. By changing the diameter of the beads, for example, the degree of dispersion of the pigment and the unadsorbed resin ratio can be changed. The smaller the diameter of the beads, the smaller $D_{50}$ of the pigment particles tends to be. The smaller the diameter of the beads, the easier it is for the core including the quinacridone pigment to be coated by the pigment coating resin and the lower the unadsorbed resin ratio tends to be. The material of the beads is not particularly limited, but a hard material (e.g., glass and zirconia) is favorable. The ejection rate of the media-type wet disperser is, for example, 200 g/min or more and 600 g/min or less. The higher the ejection rate of the media-type wet disperser, the higher the unadsorbed resin ratio tends to be.

(Activated Carbon Treatment Process)

In the activated carbon treatment process, the pigment dispersion liquid is treated with activated carbon. The activated carbon treatment removes at least part of the unadsorbed resin and the intermediate. By using such a pigment dispersion liquid, the first absorbance and the second absorbance of the ink according to this embodiment can be easily adjusted to a value within a desired range. The activated carbon treatment is carried out by, for example, circulating the pigment dispersion liquid while passing the pigment dispersion liquid through an activated carbon filter. The flow rate of the pigment dispersion liquid to be circulated is, for example, 100 g/min or more and 300 g/min or less. The time for circulating the pigment dispersion liquid is, for example, 5 minutes or more and 30 minutes or less. The number of times the one pass was made (the number of passes) in the activated carbon treatment is, for example, five or less, one pass indicating that all of the pigment dispersion liquid passes through the activated carbon filter.

(Ultrafiltration Process)

In the ultrafiltration process, the pigment dispersion liquid is subjected to ultrafiltration. The ultrafiltration removes at least part of the phosphorus-containing catalyst and reduces the phosphorus concentration of the pigment dispersion liquid. By using such a pigment dispersion liquid, the predetermined phosphorus concentration of the ink to be produced according to this embodiment can be easily adjusted to a value within a desired range. In order to remove at least part of the phosphorus-containing catalyst, it is favorable to select, as a cut-off molecular weight of the ultrafiltration film used for ultrafiltration, a cut-off molecular weight that at least part of the phosphorus-containing catalyst is filtered and the components of the pigment dispersion liquid other than this are not filtered. Further, the cut-off molecular weight of the ultrafiltration film used for ultrafiltration is favorably equal to or greater than the molecular weight of the phosphorus-containing catalyst and equal to or less than the molecular weight of the pigment coating resin. In order to adjust the predetermined phosphorus concentration to a value within a desired range, the circulation time of ultrafiltration is favorably 0.4 hours or more. In order to reduce the production costs, the circulation time of ultrafiltration is favorably 2.0 hours or less. Through the ultrafiltration, a liquid including the phosphorus-containing catalyst is discharged as a filtrate, and a liquid including the components of the pigment dispersion liquid other than the phosphorus-containing catalyst circulates again as a recovered liquid. By adding water whose amount is equal to that of the discharged filtrate to the recovered liquid, the solid content concentration of the pigment dispersion liquid can be maintained at a constant level.

(Mixing Process)

In the mixing process, the pigment dispersion liquid after ultrafiltration and components to be blended as necessary (e.g., an aqueous medium and a surfactant to be further added) are mixed using a stirrer. After mixing the components in the ink, the foreign substance and coarse particles may be removed using a filter (e.g., a filter having a pore size of 5 μm or less).

In the method of producing the ink according to this embodiment, the ratio of the pigment dispersion liquid in all raw materials is, for example, 25 mass % or more and 60 mass % or less. Note that the ink according to this embodiment can be suitably used in, for example, an inkjet recording apparatus described below.

Second Embodiment: Inkjet Recording Apparatus

Next, an inkjet recording apparatus according to a second embodiment of the present disclosure will be described. The inkjet recording apparatus according to this embodiment includes a conveying unit that conveys a recording medium, and a recording head. The recording head ejects the ink according to the first embodiment to the recording medium. Therefore, the inkjet recording apparatus according to this embodiment includes an ink that has excellent ejection stability, dispersion stability, and redissolvability and is capable of forming images with excellent abrasion resistance for the same reason as that described in the first embodiment.

An inkjet recording apparatus 1 that is an example of the inkjet recording apparatus according to this embodiment will be described below with reference to the drawings. Note that the drawings to be referred to schematically show mainly respective components for ease of understanding, the size, number, and the like of each illustrated component are different from actual ones in some cases. Further, X, Y, and Z axes shown in FIG. 1 to FIG. 4 are orthogonal to each other.

The inkjet recording apparatus 1 shown in FIG. 1 includes a paper feed unit 3, a first recording head 4C, a second recording head 4M, a third recording head 4Y, a fourth recording head 4K, a liquid housing unit 5, a first conveying unit 6, a second conveying unit 7, an output unit 8, and a maintenance unit 9. Hereinafter, in the case where there is no need to distinguish between the first recording head 4C to the fourth recording head 4K, they will be referred to simply as the "recording head 4" in some cases.

The paper feed unit 3 includes a plurality of paper feed cassettes 31, a plurality of pick-up rollers 32, a plurality of conveying rollers 33, and a resist roller pair 34. Recording media S are stacked and housed in the paper feed cassette 31. The pick-up roller 32 takes out the recording media S housed in the paper feed cassette 31 one by one. The conveying roller 33 conveys the recording medium S taken out by the pick-up roller 32. The resist roller pair 34 causes the recording medium S conveyed by the conveying roller 33 to be temporarily left in place and then supplies the recording medium S to the first conveying unit 6 at predetermined timing.

The recording head 4 is disposed above the first conveying unit 6. The first recording head 4C to the fourth recording head 4K are arranged in this order in a conveying direction D of the recording medium S. Each of the first recording head 4C to the fourth recording head 4K is arranged at the same height. The first recording head 4C to the fourth recording head 4K are respectively filled with inks of four different colors (e.g., cyan, magenta, yellow, and black). The ink to be deposited in the second recording head 4M is the ink according to the first embodiment, which is magenta. The recording head 4 ejects the respective inks to the recording medium S. Of the recording head 4, the second recording head 4M ejects the ink according to the first embodiment, which is magenta, to the recording medium S. As a result, an image (e.g., a color image) is formed on the recording medium S conveyed by a first convey belt 63.

The liquid housing unit 5 includes a first ink tank 51C, a second ink tank 51M, a third ink tank 51Y, a fourth ink tank 51K, and a cleaning solution tank 52. Hereinafter, in the case where there is no need to distinguish between the first ink tank 51C to the fourth ink tank 51K, they are referred to simply as the "ink tank 51" in some cases. The first ink tank 51C to the fourth ink tank 51K house respective inks of four different colors (e.g., cyan, magenta, yellow, and black). The ink to be housed in the second ink tank 51M is the ink according to the first embodiment, which is magenta. The first ink tank 51C to the fourth ink tank 51K respectively supply the inks to the first recording head 4C to the fourth recording head 4K. The cleaning solution tank 52 supplies a cleaning solution to a liquid impregnated body 91.

The first conveying unit 6 is disposed on the downstream side of the paper feed unit 3 in the conveying direction D of the recording medium S. The first conveying unit 6 includes a first driven roller 61, a first drive roller 62, and the first convey belt 63. The first drive roller 62 is disposed on the downstream side of the first driven roller 61 in the conveying direction D of the recording medium S. The first convey belt 63 is an endless belt stretched over the first driven roller 61 and the first drive roller 62. The first drive roller 62 is driven to rotate in the counterclockwise direction in FIG. 1. As a result, the first drive roller 62 drives the first convey belt 63 in a driven manner. As a result, the first convey belt 63 conveys the recording medium S supplied from the paper feed unit 3 to the second conveying unit 7 in the conveying direction D. In this way, the first conveying unit 6 coneys the recording medium S. The first driven roller 61 rotates in accordance with the first drive roller 62 via the first convey belt 63.

The second conveying unit 7 is disposed on the downstream side of the first conveying unit 6 in the conveying direction D of the recording medium S. The second conveying unit 7 includes a second driven roller 71, a second driven roller 72, and a second convey belt 73. The second driven roller 72 is disposed on the downstream side of the second driven roller 71 in the conveying direction D of the recording medium S. The second convey belt 73 is an endless belt stretched over the second driven roller 71 and the second driven roller 72. The second driven roller 72 is driven to rotate in the counterclockwise direction in FIG. 1. As a result, the second driven roller 72 drives the second convey belt 73 in a driven manner. As a result, the second convey belt 73 coneys the recording medium S conveyed from the first conveying unit 6 to the output unit 8 in the conveying direction D. In this way, the second conveying unit 7 conveys the recording medium S. The second driven roller 71 rotates in accordance with the second driven roller 72 via the second convey belt 73.

The output unit 8 is disposed on the downstream side of the second conveying unit 7 in the conveying direction D of the recording medium S. The output unit 8 includes an output tray 81, an output drive roller 82, and an output driven roller 83. The output drive roller 82 and the output driven roller 83 are pressed against each other at positions facing each other. The output drive roller 82 is driven to rotate in the counterclockwise direction in FIG. 1. The output driven roller 83 rotates in accordance with rotation of the output drive roller 82. As a result, the output drive roller 82 and the output driven roller 83 outputs the recording medium S conveyed from the second conveying unit 7 to the output tray 81. The output recording medium S is placed on the output tray 81.

The maintenance unit 9 includes the liquid impregnated body 91 and a cleaning member 92. The liquid impregnated body 91 is impregnated with the cleaning solution. The liquid impregnated body 91 comes into contact with an ejection surface 42 (see FIG. 2) of the recording head 4 to supply the cleaning solution to the ejection surface 42. The liquid impregnated body 91 is, for example, a sponge, a non-woven fabric, or a water-absorbent sheet. The cleaning member 92 wipes the ejection surface 42 of the recording head 4. As a result, the ink adhering to the ejection surface 42 is cleaned. The cleaning member 92 is, for example, a rubber wiper.

Figure 2:
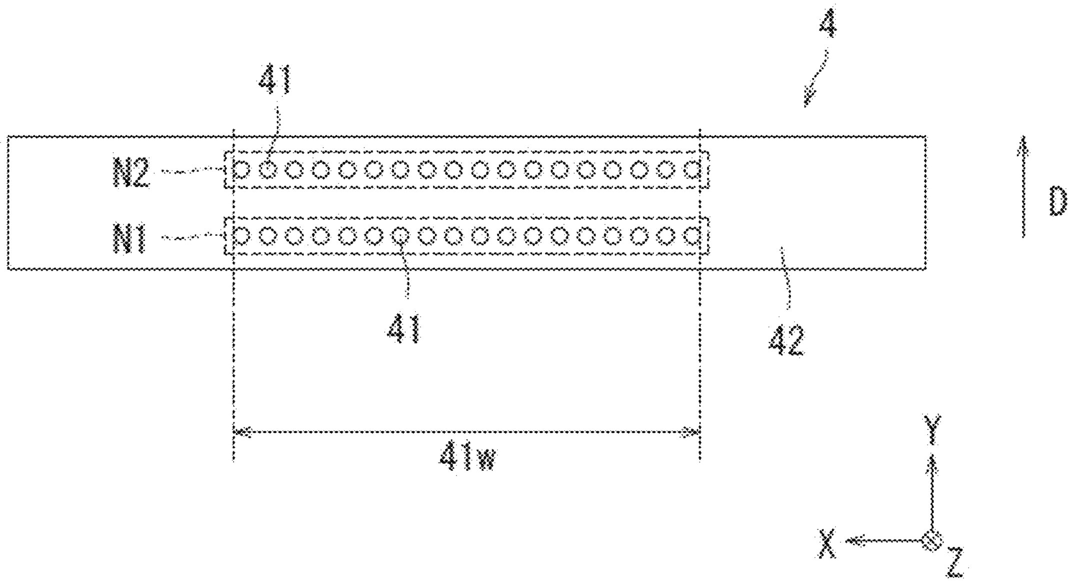
FIG. 2 is a diagram showing a lower surface of recording head shown in FIG. 1.

Next, the recording head 4 will be further described with reference to FIG. 2. FIG. 2 is a diagram showing the lower surface of the recording head 4 shown in FIG. 1.

As shown in FIG. 2, the recording head 4 includes a first nozzle column N1, a second nozzle column N2, and the ejection surface 42. For ease of understanding, in FIG. 2, the first nozzle column N1 and the second nozzle column N2 are each surrounded by broken lines. Each of the first nozzle column N1 and the second nozzle column N2 includes a plurality of nozzles 41. The nozzle 41 ejects an ink to the recording medium S. The nozzle 41 opens into the ejection surface 42. The first nozzle column N1 and the second nozzle column N2 are disposed side by side in the conveying direction D of the recording medium S. In each of the first nozzle column N1 and the second nozzle column N2, the plurality of nozzles 41 is provided at intervals in the direction orthogonal to the conveying direction D of the recording medium S. The recording head 4 is, for example, a line head.

A width 41*w* of each of the first nozzle column N1 and the second nozzle column N2 (i.e., the width of the recordable region of the recording head 4), is equal to or wider than the width of the recording medium S. For this reason, the recording head 4 is capable of recording, in a fixed state, an image on the recording medium S conveyed on the first convey belt 63. That is, the inkjet recording apparatus 1 employs a single-pass system that is a system in which shuttle movement is not performed. Since the inkjet recording apparatus 1 includes such a recording head 4, printing can be performed at high speed as compared with an inkjet recording apparatus that includes a serial head.

Figure 3:
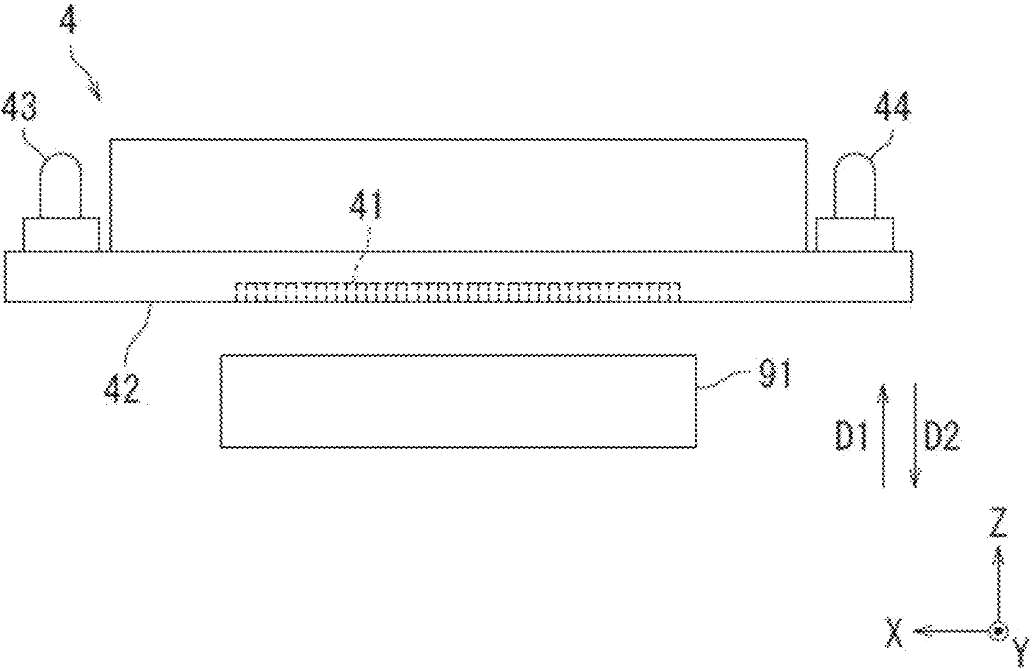
FIG. 3 is a diagram describing an operation of supplying a cleaning solution.
Figure 4:
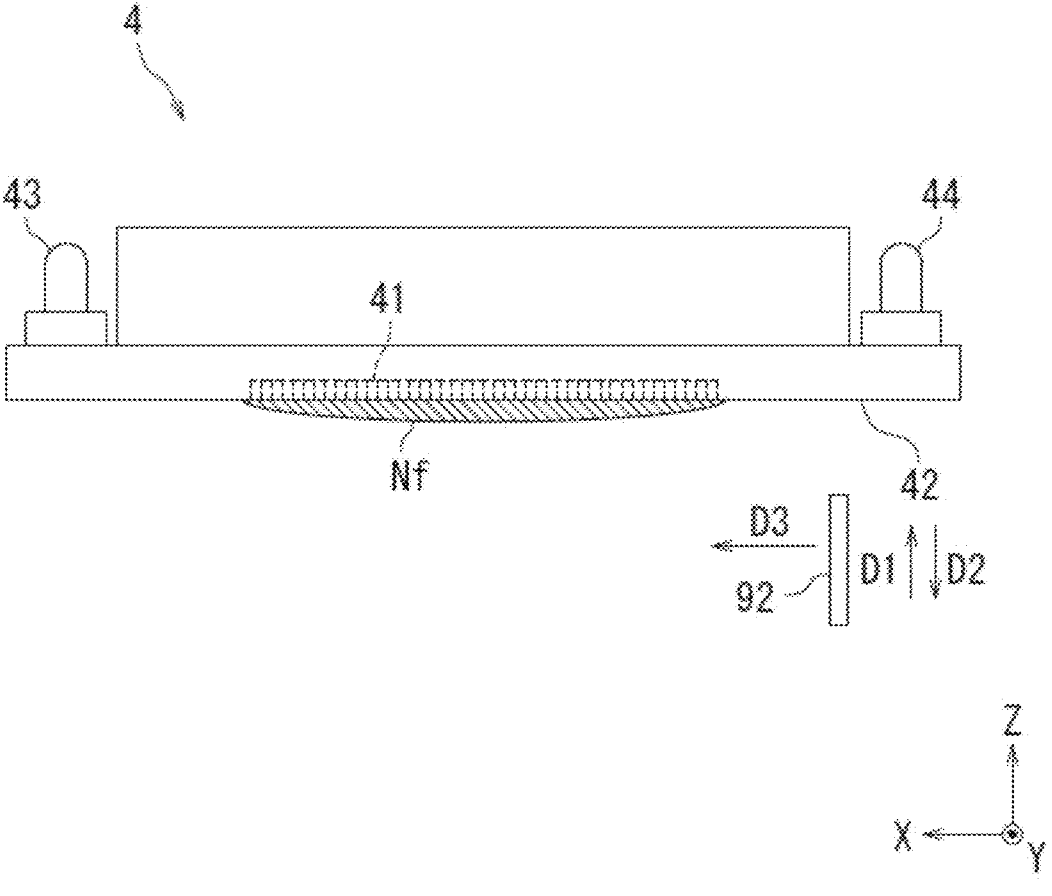
FIG. 4 is a diagram describing a purge operation and a wipe operation.

Next, the cleaning operation by the maintenance unit 9 will be described with reference to FIG. 3 and FIG. 4. The cleaning operation includes an operation of supplying a cleaning solution, a purge operation, and a wipe operation. FIG. 3 is a diagram describing the operation of supplying a cleaning solution. FIG. 4 is a diagram describing the purge operation and the wipe operation. Note that although the nozzles 41 cannot be seen in the side view of the recording head 4, for ease of understanding, the positions of the nozzles 41 are indicated by broken lines in FIG. 3 and FIG. 4.

As shown in FIG. 3, the recording head 4 includes an ink inlet 43 and an ink outlet 44. An ink flows from the ink tank 51 into the recording head 4 through the ink inlet 43, and flows out from the recording head 4 through the ink outlet 44.

As shown in FIG. 1, the liquid impregnated body 91 included in the maintenance unit 9 is disposed below the second conveying unit 7. The cleaning member 92 included in the maintenance unit 9 is disposed below the liquid impregnated body 91. The liquid impregnated body 91 and the cleaning member 92 are each capable of moving between a position facing the second conveying unit 7 and a position facing the ejection surface 42 of the recording head 4. As shown in FIG. 3, the liquid impregnated body 91 is capable of moving in an ascending direction D1 and a descending direction D2. As shown in FIG. 4, the cleaning member 92 is capable of moving in the ascending direction D1, the descending direction D2, and a wiping direction D3. The "ascending direction D1" is a direction approaching the ejection surface 42 in the Z-axis direction. Further, the "descending direction D2" is a direction away from the ejection surface 42 in the Z-axis direction. Further, the "wiping direction D3" is a direction along the ejection surface 42. Each of the liquid impregnated body 91 and the cleaning member 92 are caused to move by a known drive mechanism (not shown).

The ink adhering to the ejection surface 42 dries to be fixed in some cases. In order to clean the fixed ink, the cleaning operation is performed.

First, of the cleaning operation, the operation of supplying a cleaning solution will be described. The liquid impregnated body 91 is impregnated with a cleaning solution. Next, as shown in FIG. 3, the liquid impregnated body 91 is caused to move to a position facing the ejection surface 42 and then move in the ascending direction D1. The liquid impregnated body 91 is then pressed against the ejection surface 42. In this way, the cleaning solution with which the liquid impregnated body 91 is impregnated is deposited on the ejection surface 42. It is favorable that the liquid impregnated body 91 is maintained pressed against the ejection surface 42 for a predetermined time. The predetermined time is favorably 1 second or more and 5 minutes or less. After the predetermined time elapses, the liquid impregnated body 91 is caused to move in the descending direction D2. The state in which the liquid impregnated body 91 is pressed against the ejection surface 42 is then released.

Next, the purge operation will be described. As shown in FIG. 4, an ink is purged from the recording head 4. In FIG. 4, the purged ink (purge ink) is denoted by the reference symbol "Nf". Specifically, pressurizing the recording head 4 forcibly ejects the ink from the nozzle 41. As a result, the clogging and the like of the nozzle 41 are eliminated, and the purge ink Nf is deposited on the ejection surface 42 of the recording head 4.

Next, the wipe operation will be described. The cleaning member 92 is caused to move to a position facing the ejection surface 42 (position shown in FIG. 4) and then move in the ascending direction D1. The cleaning member 92 is then pressed against the ejection surface 42. The cleaning member 92 is caused to move in a direction along the ejection surface 42 (wiping direction D3 shown in FIG. 4) while the cleaning member 92 is maintained pressed against the ejection surface 42. In this way, the cleaning member 92 wipes the ejection surface 42. As a result, the ink (e.g., the fixed ink and the purge ink Nf) adhering to the ejection surface 42 and the cleaning solution are removed. In this way, the ejection surface 42 of the recording head 4 is cleaned. Subsequently, the cleaning member 92 is caused to move in the descending direction D2. The state in which the cleaning member 92 is pressed against the ejection surface 42 is released.

The above is the description of the inkjet recording apparatus 1 that is an example of the inkjet recording apparatus according to this embodiment. However, the inkjet recording apparatus according to this embodiment is not limited to the inkjet recording apparatus 1. The inkjet recording apparatus according to this embodiment may adopt a multi-pass system. Further, in the first recording head 4C to the fourth recording head 4K, the number of nozzles 41, the intervals between the nozzles 41, and the positional relationship between the nozzles 41 can be appropriately set in accordance with the specifications of the apparatus. Further, the operation of supplying a cleaning solution may be ejection of a cleaning solution by an ink jet method, application of a cleaning solution using a roller, or spraying of a cleaning solution. Further, the operation of supplying a cleaning solution, the purge operation, and the wipe operation may each be repeated. Further, the order for performing the operation of supplying a cleaning solution and the purge operation is not limited. Further, the cleaning member 92 may be caused to move back and forth in a direction along the ejection surface 42. For example, while the cleaning member 92 is maintained pressed against the ejection surface 42, the cleaning member 92 is caused to move in a first direction (the wiping direction D3 shown in FIG. 4) along the ejection surface 42 and then move in a second direction (direction opposite to the wiping direction D3 shown in FIG. 4) opposite to the first direction along the ejection surface 42.

EXAMPLES

Examples of the present disclosure will be described below. However, the present disclosure is not limited to the following Examples. Note that in the following Example, ion exchanged water is referred to simply as water.

[Preparation of Pigment Coating Resin]

First, as a pigment coating resin to be used for preparing an ink, pigment coating resins (R-A) and (R-B) shown in Table 1 were prepared. Each of the pigment coating resins (R-A) and (R-B) had a repeating unit derived from methacrylic acid (MAA unit), a repeating unit derived from methyl methacrylate (MMA unit), a repeating unit derived from butyl acrylate (BA unit), and a repeating unit derived from styrene (ST unit). The content ratio of each repeating unit to all repeating units included in the pigment coating resins (R-A) and (R-B), a mass average molecular weight (Mw), and the acid value are shown in Table 1.

(Measurement of Acid Value)

The above acid value was measured in accordance with "Japanese Industrial Standard (JIS) K0070:1992".

(Measurement of Mass Average Molecular Weight)

The above mass average molecular weight was measured under the following measurement conditions using gel permeation chromatography ("HLC-8020GPC" manufactured by TOSOH CORPORATION). Calibration curves were created using "F-40", "F-20", "F-4", "F-1", "A-5000", "A-2500", and "A-1000", which are TSKgel standard polystyrene manufactured by TOSOH CORPORATION, and n-propylbenzene.

The measurement conditions for the mass average molecular weight were as follows.

Column: "TSKgel SuperMultiporeHZ-H" (semi-micro-column of 4.6 mm I.D.×15 cm) manufactured by TOSOH CORPORATION Number of columns: 3

Eluent: tetrahydrofuran

Flow rate: 0.35 mL/min

Sample injection amount: 10 μL

Measurement temperature: 40° C.

Detector: RI (refractive index) detector

TABLE 1

| Pigment coating resin | MAA unit [Mass %] | MMA unit [Mass %] | BA unit [Mass %] | ST unit [Mass %] | Mw | Acid value [mgKOH/g] |
|---|---|---|---|---|---|---|
| R-A | 8.1 | 36.9 | 30.0 | 25.0 | 20000 | 100 |
| R-B | 6.5 | 20.0 | 20.0 | 53.5 | 19000 | 80 |

<Preparation of Ink (A-1)>

(Preparation of Pigment Composition (P1))

A mixture A was obtained by mixing a wet cake of a quinacridone pigment (C.I. Pigment Red 122) with a solid content of 95 parts by mass and 5 parts by mass of methanol. A mixture B was obtained by mixing all of the mixture A and 5 parts by mass of the sulfur-containing pigment derivative (1-1). Methanol was distilled off under reduced pressure at 80° C. from the mixture B to obtain a residue. The residue was filtered with water and dried at 80° C. to obtain a dried product. The dried product was pulverized using a Counter Jet Mill (registered trademark) (manufactured by Hosokawa Micron Group) to obtain a pigment composition (P1). In the pigment composition (P1), the content ratio of the pigment derivative was 5 mass %.

(Preparation of Pigment Dispersion Liquid)

6.0 parts by mass of the pigment coating resin (R-A) and an aqueous sodium hydroxide solution were mixed. The aqueous sodium hydroxide solution contained a predetermined amount of sodium hydroxide. The "predetermined amount" shown in Table 2, which is the amount of added sodium hydroxide, indicates 1.05 times the amount necessary for neutralizing an equal amount of the pigment coating resin (R-A). As a result, the pigment coating resin (R-A) was neutralized with an equal amount (strictly speaking, 105% equal amount) of sodium hydroxide to obtain an aqueous solution C including the pigment coating resin (R-A).

All of the obtained aqueous solution C, 15.0 parts by mass of the pigment composition (P1), 0.5 parts by mass of a nonionic surfactant, and water were added to a vessel. As a result, a mixed solution D having a composition X-1 shown in Table 2 was obtained. The amount of water added to the vessel was set such that the total amount of the mixed solution D (content of the vessel) was 100.0 parts by mass. As the nonionic surfactant, "OLFINE (registered trademark) E1010" (ethylene oxide adduct of acetylenediol, active ingredient concentration: 100 mass %, HLB value: 13.5±0.5) manufactured by Nissin Chemical co., ltd. was used. The content of the vessel was mixed using a media-type wet disperser ("DYNO (registered trademark)-MILL" manufactured by Willy A Bachofen AG (WAB)) to obtain a mixed solution E.

In Table 2, the "remaining amount", which is the amount of added water, means the amount set such that the mixed solution D is 100.0 parts by mass. In table 2, the "predetermined amount", which is the amount of added sodium hydroxide, indicates 1.05 times the amount necessary for neutralizing an equal amount of the pigment coating resin (R-A). The remaining amount of water shown in Table 2 represents the total mass of the water added to the above vessel and water contained in the aqueous solution C (in detail, water contained in the aqueous sodium hydroxide solution used for neutralizing the pigment coating resin (R-A) and water generated by the neutralization reaction between the pigment coating resin (R-A) and sodium hydroxide).

The mixed solution E was dispersed using zirconia beads (particle diameter of 0.5 mm) as media and a bead mill ("nano grain mill" manufactured by ASADA IRON WORKS.CO.,LTD.). The dispersion using the bead mill was performed at the conditions of a temperature of 10° C. and a circumferential speed of 8 m/sec. In the dispersion, the ejection rate of the bead mill (hereinafter, referred to as an "ejection rate m" in some cases) was set to 300 g/min. In this way, a pigment dispersion liquid F was obtained.

(Activated Carbon Treatment)

The obtained pigment dispersion liquid F was subjected to activated carbon treatment. In detail, the pigment dispersion liquid F was caused to circulate at the flow rate of 190 g/min while causing 1800 g of the pigment dispersion liquid F to pass through an activated carbon filter ("YCC-1L" manufactured by Nihon Filter Co., Ltd., type of activated carbon: coconut shell granular activated carbon). Hereinafter, 1800 g of the pigment dispersion liquid F passing through the activated carbon filter will be referred to as one pass. The circulation of the pigment dispersion liquid F was stopped at the time point of five passes, and a pigment dispersion liquid G after activated carbon treatment was obtained. Therefore, the number of times the one pass was made (the number of passes) in the activated carbon treatment was five.

(Ultrafiltration Treatment)

The pigment dispersion liquid G after activated carbon treatment was filtered by vibrating ultrafiltration. In detail, 480 g of the pigment dispersion liquid G was caused to circulate at the flow rate of 390 g/min using an ultrafiltration film under the condition that the internal pressure applied to the ultrafiltration film is 50 kPa. The circulation time (hereinafter, referred to as a "circulation time t" in some cases) was 30 minutes. As the ultrafiltration film, "UF pencil type module AHP-0013D" (material of hollow fiber membrane: polyacrylonitrile, membrane inner diameter: 0.8 mm, effective membrane area: 170 $cm^2$) manufactured by Asahi Kasei Corporation was used. Details of ultrafiltration will be described. The ultrafiltration separated the pigment dispersion liquid G into the filtrate and components (recovered liquid) other than the filtrate. The filtrate included at least part of the phosphorus-containing catalyst included in the pigment dispersion liquid G. Of the filtrate and the recovered liquid separated by filtration, the filtrate was discharged from the system and the recovered liquid was caused to circulate again. During the recirculation of the recovered liquid, water whose amount was equal to the amount of the discharged filtrate was added to the recovered liquid. As a result, the solid content concentration of the recovered liquid matched the solid content concentration of the pigment dispersion liquid G. In this way, a pigment dispersion liquid H after ultrafiltration was obtained. The composition of the pigment dispersion liquid H was the composition X-1 shown in Table 2.

TABLE 2

| Composition X-1 | Parts by mass |
|---|---|
| Pigment coating resin (R-A) | 6.0 |
| Sodium hydroxide | Predetermined amount |

TABLE 2-continued

| Composition X-1 | Parts by mass |
|---|---|
| Pigment composition (P1) | 15.0 |
| OLFINE E1010 | 0.5 |
| Water | Remaining amount |
| Total | 100.0 |

(Preparation of Ink)

An ink (A-1) was prepared such that a composition i-a shown in Table 3 is obtained.

TABLE 3

| Ink | Composition i-a [Parts by mass] |
|---|---|
| Pigment dispersion liquid H | 40.0 |
| SURFYNOL 420 | 0.3 |
| Triethylene glycol monobutylether | 4.0 |
| 3-methyl-1,5-pentanediol | 20.0 |
| Glycerin | 5.0 |
| Water | Remaining amount |
| Total | 100.0 |

Water was added to a flask equipped with a stirrer ("Three-One Motor (registered trademark) BL-600" manufactured by Shinto Scientific Co., Ltd.). While stirring the content of the flask at a stirring speed of 400 rpm using the stirrer, the pigment dispersion liquid G obtained by the above ultrafiltration treatment, a nonionic surfactant, triethylene glycol monobutylether, 3-methyl-1,5-pentanediol, and glycerin were added thereto to obtain a mixed solution I. As the nonionic surfactant, "SURFYNOL (registered trademark) 420" (ethylene oxide adduct of acetylene glycol, active ingredient concentration: 100 mass %, HLB value: 4) manufactured by Nissin Chemical co., ltd. was used. The amount of each added raw material was as shown in Table 3. The "remaining amount" shown in Table 3, which is the amount of added water, represents the amount that the mixed solution I is 100.0 parts by mass. The mixed solution I was filtered using a filter with a pore size of 5 μm to remove foreign substances and coarse particles from the mixed solution I. In this way, the ink (A-1) was obtained.

[Measurement]

The ink to be measured (in detail, the ink (A-1)) was centrifuged by the following method. The predetermined phosphorus concentration, the predetermined sulfur concentration, the unadsorbed resin ratio, the first absorbance, and the second absorbance of the obtained supernatant liquid were measured. The measurement results are shown in Table 4.

<Centrifugal Treatment>

2 g of the ink sealed in a container was centrifuged at the rotation speed of 140,000 rpm (corresponding to the centrifugal force of 1,050,000 G) for 3 hours under an environment of 23° C. using an ultracentrifuge ("himac (registered trademark) CS150FNX" manufactured by Eppendorf Himac Technologies Co., Ltd., rotor: S140AT). The centrifugal treatment precipitated the solids (mainly pigment particles) of the components contained in the ink, and the other components formed the supernatant liquid. The supernatant liquid was collected from the container with a syringe.

<Predetermined Phosphorus Concentration and Predetermined Sulfur Concentration>

1 mL of the supernatant liquid was diluted 50-fold with water and used as a measurement sample. The phosphorus concentration and the sulfur concentration in the measurement sample were measured using an inductively coupled plasma (ICP) mass spectrometer "iCAP PRO ICP-OES Duo" manufactured by Thermo Fisher Scientific Inc.). The phosphorus concentration (unit: ppm) and the sulfur concentration (unit: ppm) in the supernatant liquid were respectively calculated by multiplying the phosphorus concentration (unit: ppm) and the sulfur concentration (unit: ppm) in the measurement sample (50-fold diluted solution of the supernatant liquid) by 50. The phosphorus concentration and the sulfur concentration in the supernatant liquid were respectively used as the predetermined phosphorus concentration (unit: ppm) and the predetermined sulfur concentration (unit: ppm). Note that in order to obtain the phosphorus concentration in the measurement sample, a calibration curve created using a sample whose phosphorus concentration was known was used. In order to obtain the sulfur concentration in the measurement sample, a calibration curve created using a sample whose sulfur concentration was known was used.

<Volume Median Diameter of Pigment Particles>

The ink was diluted 100-fold with water and used as a measurement sample. The volume median diameter of pigment particles in the measurement sample was measured using a dynamic light scattering particle size distribution analyzer ("Zetasizer Nano ZS" manufactured by Malvern Panalytical Ltd.). The volume median diameter of pigment particles in the measurement sample was regarded as the volume median diameter ($D_{50}$) of pigment particles included in the ink.

<Unadsorbed Resin Ratio>

2 g of the ink sealed in a container was centrifuged under the above-mentioned conditions. All of the supernatant liquid obtained by the centrifugal treatment was collected. Next, all of the collected supernatant liquid was dried under a reduced pressure (drying temperature: 60° C., drying time: 24 hours) to completely remove water. The mass (WA) of the residue (solids) after the drying under a reduced pressure was regarded as the mass of the unadsorbed resin.

The mass (WD) of the pigment coating resin included in the 2 g of the ink was calculated by the following formula on the basis of a content ratio B (=6.0 mass %) of the pigment coating resin in the composition X-1 read from Table 2 and a content ratio C(=40.0 mass %) of the pigment dispersion liquid in the ink read from Table 3.

$$WD = 2 \times (C/100) \times (B/100)$$

The unadsorbed resin ratio was then calculated by the following formula on the basis of the mass (WA) of the residue obtained from the 2 g of the ink and the mass (WD) of the pigment coating resin included in the 2 g of the ink.

$$\text{Unadsorbed resin ratio [mass \%]} = 100 \times WA/WD$$

<First Absorbance and Second Absorbance>

2 g of the ink sealed in a container was centrifuged under the above-mentioned conditions. All of the supernatant liquid obtained after the centrifugal treatment was collected with a syringe. The collected supernatant liquid was 25-fold diluted with water and used as a measurement sample. The measurement sample put in a cell was measured under the following conditions using a spectrophotometer ("U-3000" manufactured by Hitachi High-Tech Corporation) to obtain the ultraviolet-visible light absorption spectrum of the measurement sample (i.e., the 25-fold diluted solution of the supernatant liquid). The first absorbance and the second absorbance of the 25-fold diluted solution of the supernatant liquid were obtained from the ultraviolet-visible light absorption spectrum.

(Measurement Conditions for Absorbance)

Measurement wavelength range: range of 200 nm or more and 800 nm or less
Scan speed: 300 nm/min
Sampling interval: 1 nm
Slit width: 1 nm
Cell: cell formed of quartz glass
Optical path length: 10 mm
Beam method: double beam
Baseline measurement: With
Reference: water Preparation of inks (A-2) to (A-12) and (B-1) to (B-7)>

Inks (A-2) to (A-12) and (B-1) to (B-7) were prepared in the same manner as that for the preparation of the ink (A-1) except for the following changes, and various physical properties were measured. In the preparation of the inks (A-2) to (A-12) and (B-1) to (B-7), various conditions were changed as shown in Tables 4 to 6. Specifically, in the preparation of the pigment composition, the type of quinacridone pigment, the type of sulfur-containing pigment derivative, and the content ratio of the sulfur-containing pigment derivative in the pigment composition were changed. Note that the total amount of the quinacridone pigment and the sulfur-containing pigment derivative used in the preparation of the pigment composition was not changed in the preparation of each ink and was kept constant (100 parts by mass). Further, the type of pigment coating resin used in the preparation of the pigment dispersion liquid was changed. Further, the ejection rate m of the bead mill in the dispersion performed in the preparation of the pigment dispersion liquid, the number of passes in the activated carbon treatment, and the circulation time t in the ultrafiltration treatment were changed.

Note that in the measurement of the first absorbance and the second absorbance of each ink, the first peak appeared at a wavelength of 320 nm in all cases. The second peak of each peak appeared at a wavelength of 429 nm in all cases.

In Tables 4 to 6, "Ex" represents Example. "Comp" represents Comparative Example. The "pigment" represents a quinacridone pigment. The "derivative" represents a sulfur-containing pigment derivative. "wt %" represents the content ratio of the quinacridone pigment or sulfur-containing pigment derivative in the pigment composition. "PR" represents C.I. Pigment Red 122. "PV" represents C.I. Pigment Violet 19. The "unadsorbed resin" represents the ratio of the unadsorbed resin to the pigment coating resin. "1-1" and "1-2" of the type of the derivative respectively represent compounds represented by the formulae (1-1) and (1-2).

TABLE 4

| Ink | | | Ex 1<br>A-1 | Ex 2<br>A-2 | Ex 3<br>A-3 | Ex 4<br>A-4 | Ex 5<br>A-5 | Ex 6<br>A-6 |
|---|---|---|---|---|---|---|---|---|
| Pigment composition | Pigment | Type | PR | PR | PR | PR | PR | PR |
| | | [wt %] | 95 | 88 | 96 | 88 | 88 | 95 |
| | Derivative | Type | 1-1 | 1-1 | 1-1 | 1-1 | 1-1 | 1-1 |
| | | [wt %] | 5 | 12 | 4 | 12 | 12 | 5 |
| Pigment coating resin | | Type | R-A | R-A | R-A | R-A | R-A | R-A |
| | | Parts by mass | 6.0 | 6.0 | 6.0 | 6.0 | 6.0 | 6.0 |
| Unadsorbed resin | Ratio | [wt %] | 30 | 50 | 20 | 50 | 50 | 30 |
| Second absorbance | (Free resin) | (320 nm) | 0.20 | 0.27 | 0.16 | 0.21 | 0.35 | 0.16 |
| First absorbance | (Intermediate) | (429 nm) | 0.002 | 0.001 | 0.001 | 0.002 | 0.001 | 0.001 |
| Predetermined sulfur concentration | | [ppm] | 1.3 | 1.5 | 7.2 | 5.2 | 6.4 | 2.0 |
| Predetermined phosphorous concentration | | [ppm] | 6.0 | 2.0 | 5.4 | 6.5 | 12.0 | 3.0 |
| Pigment particles | $D_{50}$ | [nm] | 135 | 130 | 120 | 125 | 124 | 130 |
| Dispersion | Ejection rate m | [g/min] | 300 | 300 | 300 | 300 | 300 | 300 |
| Ultrafiltration treatment | Circulation time t | [min] | 30 | 120 | 30 | 60 | 30 | 120 |
| Activated carbon treatment | Number of passes | [Times] | 5 | 5 | 5 | 5 | 5 | 5 |

TABLE 5

| Ink | | | Ex 7<br>A-7 | Ex 8<br>A-8 | Ex 9<br>A-9 | Ex 10<br>A-10 | Ex 11<br>A-11 | Ex 12<br>A-12 |
|---|---|---|---|---|---|---|---|---|
| Pigment composition | Pigment | Type | PR | PR | PR | PV | PR | PR |
| | | [wt %] | 96 | 95 | 95 | 95 | 95 | 95 |
| | Derivative | Type | 1-1 | 1-1 | 1-1 | 1-1 | 1-2 | 1-1 |
| | | [wt %] | 4 | 5 | 5 | 5 | 5 | 5 |
| Pigment coating resin | | Type | R-A | R-A | R-A | R-A | R-A | R-B |
| | | Parts by mass | 6.0 | 6.0 | 6.0 | 6.0 | 6.0 | 6.0 |
| Unadsorbed resin | Ratio | [wt %] | 30 | 40 | 40 | 30 | 40 | 30 |
| Second absorbance | (Free resin) | (320 nm) | 0.16 | 0.30 | 0.30 | 0.30 | 0.20 | 0.30 |
| First absorbance | (Intermediate) | (429 nm) | 0.001 | 0.002 | 0.002 | 0.002 | 0.001 | 0.001 |
| Predetermined sulfur concentration | | [ppm] | 12.0 | 12.0 | 1.6 | 4.3 | 2.2 | 3.5 |
| Predetermined phosphorous concentration | | [ppm] | 8.0 | 11.0 | 6.4 | 6.0 | 2.1 | 1.4 |
| Pigment particles | $D_{50}$ | [nm] | 98 | 100 | 120 | 103 | 122 | 105 |
| Dispersion | Ejection rate m | [g/min] | 300 | 600 | 300 | 300 | 300 | 300 |

TABLE 5-continued

| Ink | | | Ex 7 A-7 | Ex 8 A-8 | Ex 9 A-9 | Ex 10 A-10 | Ex 11 A-11 | Ex 12 A-12 |
|---|---|---|---|---|---|---|---|---|
| Ultrafiltration treatment | Circulation time t | [min] | 30 | 30 | 60 | 30 | 30 | 30 |
| Activated carbon treatment | Number of passes | [Times] | 5 | 5 | 5 | 5 | 5 | 5 |

TABLE 6

| Ink | | | Comp 1 B-1 | Comp 2 B-2 | Comp 3 B-3 | Comp 4 B-4 | Comp 5 B-5 | Comp 6 B-6 | Comp 7 B-7 |
|---|---|---|---|---|---|---|---|---|---|
| Pigment composition | Pigment | Type | PR | PR | PR | PR | PR | PR | PR |
| | | [wt %] | 87 | 99 | 87 | 87 | 97 | 99 | 99 |
| | Derivative | Type | 1-1 | 1-1 | 1-1 | 1-1 | 1-1 | 1-1 | 1-1 |
| | | [wt %] | 13 | 1 | 13 | 13 | 3 | 1 | 1 |
| Pigment coating resin | | Type | R-A | R-A | R-A | R-A | R-A | R-A | R-A |
| | | Parts by mass | 6.0 | 6.0 | 6.0 | 6.0 | 6.0 | 6.0 | 6.0 |
| Unadsorbed resin | Ratio | [wt %] | 55 | 15 | 50 | 50 | 30 | 20 | 20 |
| Second absorbance | (Free resin) | (320 nm) | 0.50 | 0.12 | 0.40 | 0.14 | 0.24 | 0.18 | 0.18 |
| First absorbance | (Intermediate) | (429 nm) | 0.002 | 0.001 | 0.002 | 0.001 | 0.200 | 0.001 | 0.001 |
| Predetermined sulfur concentration | | [ppm] | 8.3 | 7.2 | 0.3 | 13.0 | 8.0 | 1.2 | 11.0 |
| Predetermined phosphorous concentration | | [ppm] | 7.2 | 6.0 | 1.2 | 11.2 | 2.0 | 0.3 | 13.4 |
| Pigment particles | $D_{50}$ | [nm] | 102 | 115 | 138 | 93 | 110 | 132 | 92 |
| Dispersion | Ejection rate m | [g/min] | 300 | 300 | 200 | 600 | 300 | 300 | 600 |
| Ultrafiltration treatment | Circulation time t | [min] | 0 | 30 | 0 | 60 | 30 | 120 | 30 |
| Activated carbon treatment | Number of passes | [Times] | 0 | 5 | 1 | 0 | 5 | 5 | 5 |

The lots of C.I. Pigment Red 122 used in Examples 1 to 10, Example 12, and Comparative Examples 1 to 7 were different from each other. The amounts of the intermediate, the sulfur compound, and the phosphorus compound of C.I. Pigment Red 122 were different from each other due to the lot differences. Further, in the preparation of each ink, the tendency for the predetermined phosphorus concentration to decrease as the circulation time t in the ultrafiltration increased could be seen. The tendency for the predetermined sulfur concentration to increase as the content ratio of the sulfur-containing pigment derivative in the pigment composition increased could be seen. The more the ejection rate m of the bead mill, the more the ratio of the unadsorbed resin was changed. By changing the number of passes in the activated carbon treatment, the first absorbance was changed.

[Evaluation]

The ejection stability, the redissolvability, the dispersion stability, and the abrasion resistance of a formed image for each of the inks (A-1) to (A-12) and (B-1) to (B-7) were evaluated by the following method. In the description of the following evaluation method, the inks (A-1) to (A-12) and (B-1) to (B-7) are referred to simply as "ink" in some cases. The evaluation results are shown in the following Tables 7 to 9.

<Evaluation Device, Etc.>

As an evaluation device, an inkjet recording apparatus (prototype manufactured by KYOCERA Document Solutions Inc.) was used. The evaluation device was equipped with, as a recording head, a piezo line head including a nozzle (opening radius: 10 μm). As paper, "$C^2$" (A4 size plain paper) manufactured by FUJIFILM Business Innovation Corp. was used.

<Ejection Stability>

The ejection stability of the ink from the recording head was evaluated under an environment of a temperature of 25° C. and a humidity of 60% RH. The ink was set in the recording head for magenta ink of the evaluation device. The temperature of the recording head was set to 40° C. The ejection rate of the ink per pixel was set to 3.5 pL.

An image (20.5 mm×29.0 mm) with image processing settings for ejecting the ink from all nozzles of the recording head was continuously printed on sheets of paper for one hour using the evaluation device. The image (initial image) printed at the beginning of the continuous printing and the image (print-durability image) printed at the end of the continuous printing were observed with the naked eye. The presence or absence of white streaks in the initial image and the print-durability image was checked. The white streaks are image defects caused by misdirection (ejection failure) of the ink from the recording head. The ejection stability of the ink was judged in accordance with the following criteria.

(Criteria of ejection stability)

Good (A): No more white streaks are generated in the print-durability image than in the initial image.

Poor (B): More white streaks are generated in the print-durability image than in the initial image.

<Abrasion Resistance>

The abrasion resistance was evaluated in an environment of a temperature of 25° C. and a humidity of 60% RH. The ejection rate of the ink per pixel was set to 11 pL. A solid image (4 cm×5 cm) was printed on a sheet of paper (hereinafter, referred to as paper A in some cases) using the evaluation device. Next, an abrasion test described below was performed. In the abrasion test, an unused sheet of paper (hereinafter, referred to as paper B in some cases) was placed on top of the solid image printed on the paper A. Next, a 1 kg weight was placed on the paper B. The paper B was then rubbed against the solid image of the paper A five times back and forth by moving the paper B and the weight together such that only the weight's own weight was applied. After the abrasion test, the image density in a region where the solid image was not formed in the paper A (margin outside the solid image) was measured at 224 points using a reflection densitometer ("RD-19" manufactured by X-Rite). The highest value of the measured values of the image density was used as the evaluation value ($ID_{MAX}$). The lower the evaluation value ($ID_{MAX}$), the less color transfer due to abrasion and the more excellent the image is in terms of abrasion resistance. The abrasion resistance of the image formed using the ink was judged in accordance with the following criteria.

(Criteria of Abrasion Resistance)

A (good): The evaluation value ($ID_{MAX}$) is less than 0.020.

B (Poor): The evaluation value ($ID_{MAX}$) is 0.020 or more.

<Redissolvability>

0.3 mL of the ink was placed on the tip of the wiper included in the evaluation device and left to stand for 10 minutes in an environment of a temperature of 25° C. and a humidity of 60% RH. Next, the ejection surface of the recording head was wiped in an outward direction (direction opposite to the wiping direction D3 in FIG. 4) using the wiper on which the ink was placed to stretch the ink on the ejection surface. The stretched ink was dried at 45° C. for 4 days to form a dried ink on the ejection surface.

After forming the dried ink, the cleaning operation was performed using the evaluation device. In detail, a non-woven fabric impregnated with 3 g of the cleaning solution was caused to be in close contact with the ejection surface of the recording head for 30 seconds (corresponding to the operation of supplying a cleaning solution). As the cleaning solution, a cleaning solution for head cleaning for an inkjet color production printer "TASKalfa Pro 15000c" manufactured by KYOCERA Document Solutions Inc. was used. As the non-woven fabric, cut pieces of "BEMCOT (registered trademark) M-3II" manufactured by Asahi Kasei Corporation was used. Subsequently, the non-woven fabric was separated from the ejection surface of the recording head. Subsequently, 0.3 mL of the ink was forcibly ejected (purged) from the recording head (corresponding to the purge operation). Subsequently, the ejection surface of the recording head was wiped in a return direction (wiping direction D3 in FIG. 4) using the wiper (corresponding to the wipe operation). This removed the dried ink adhering to the ejection surface of the recording head together with the cleaning solution and the purge ink. Details of the cleaning operation performed in this test are substantially the same as the cleaning operation described with reference to FIG. 3 and FIG. 4. Next, the ejection surface of the recording head was observed with the naked eye, and the presence or absence of the dried ink that could not be cleaned and remained was checked. Note that the more easily the dried ink is dissolved in the cleaning solution and the purge ink, the more easily the dried ink adhering to the ejection surface of the recording head tends to be removed. The redissolvability of the ink was judged in accordance with the following criteria.

(Criteria of Redissolvability)

A (good): No dried ink is observed on the ejection surface of the recording head.

B (poor): A small amount of a dried ink was observed on the ejection surface of the recording head.

C (particularly poor): A dried ink was clearly observed on the ejection surface of the recording head.

<Dispersion Stability>

The dispersion stability of the ink was judged using the volume median diameter ($D_{50}$) of pigment particles included in the above-mentioned ink as the evaluation value, in accordance with the following criteria.

(Criteria of Dispersion Stability)

Good (A): The volume median diameter of pigment particles is less than 135 nm.

Poor (B): The volume median diameter of pigment particles is 135 nm or more.

TABLE 7

| Ink | | Ex 1<br>A-1 | Ex 2<br>A-2 | Ex 3<br>A-3 | Ex 4<br>A-4 | Ex 5<br>A-5 | Ex 6<br>A-6 |
|---|---|---|---|---|---|---|---|
| Unadsorbed resin ratio | [wt %] | 30 | 50 | 20 | 50 | 50 | 30 |
| Second absorbance | (320 nm) | 0.20 | 0.27 | 0.16 | 0.21 | 0.35 | 0.16 |
| First absorbance | (429 nm) | 0.002 | 0.001 | 0.001 | 0.002 | 0.001 | 0.001 |
| Predetermined sulfur concentration | [ppm] | 1.3 | 1.5 | 7.2 | 5.2 | 6.4 | 2.0 |
| Predetermined phosphorous concentration | [ppm] | 6.0 | 2.0 | 5.4 | 6.5 | 12.0 | 3.0 |
| Ejection stability | | A | A | A | A | A | A |
| Abrasion resistance | $ID_{MAX}$ | 0.003 | 0.010 | 0.011 | 0.003 | 0.006 | 0.003 |
| | Judgment | A | A | A | A | A | A |
| Redissolvability | | A | A | A | A | A | A |
| Dispersion stability | $D_{50}$[nm] | 135 | 130 | 120 | 125 | 124 | 130 |
| | Judgment | A | A | A | A | A | A |

TABLE 8

| Ink | | Ex 7<br>A-7 | Ex 8<br>A-8 | Ex 9<br>A-9 | Ex 10<br>A-10 | Ex 11<br>A-11 | Ex 12<br>A-12 |
|---|---|---|---|---|---|---|---|
| Unadsorbed resin ratio | [wt %] | 30 | 40 | 40 | 30 | 40 | 30 |
| Second absorbance | (320 nm) | 0.16 | 0.30 | 0.30 | 0.30 | 0.20 | 0.30 |
| First absorbance | (429 nm) | 0.001 | 0.002 | 0.002 | 0.002 | 0.001 | 0.001 |
| Predetermined sulfur concentration | [ppm] | 12.0 | 12.0 | 1.6 | 4.3 | 2.2 | 3.5 |
| Predetermined phosphorous concentration | [ppm] | 8.0 | 11.0 | 6.4 | 6.0 | 2.1 | 1.4 |
| Ejection stability | | A | A | A | A | A | A |
| Abrasion resistance | $ID_{MAX}$ | 0.004 | 0.003 | 0.014 | 0.003 | 0.011 | 0.018 |
| | Judgment | A | A | A | A | A | A |
| Redissolvability | | A | A | A | A | A | A |
| Dispersion stability | $D_{50}$[nm] | 98 | 100 | 120 | 103 | 122 | 105 |
| | Judgment | A | A | A | A | A | A |

TABLE 9

| Ink | | Comp 1 B-1 | Comp 2 B-2 | Comp 3 B-3 | Comp 4 B-4 | Comp 5 B-5 | Comp 6 B-6 | Comp 7 B-7 |
|---|---|---|---|---|---|---|---|---|
| Unadsorbed resin ratio | [wt %] | 55 | 15 | 50 | 50 | 30 | 20 | 20 |
| Second absorbance | (320 nm) | 0.50 | 0.12 | 0.40 | 0.14 | 0.24 | 0.18 | 0.18 |
| First absorbance | (429 nm) | 0.002 | 0.001 | 0.002 | 0.001 | 0.200 | 0.001 | 0.001 |
| Predetermined sulfur concentration | [ppm] | 8.3 | 7.2 | 0.3 | 13.0 | 8.0 | 1.2 | 11.0 |
| Predetermined phosphorous concentration | [ppm] | 7.2 | 6.0 | 1.2 | 11.2 | 2.0 | 0.3 | 13.4 |
| Ejection stability | | B | A | A | A | B | A | B |
| Abrasion resistance | $ID_{MAX}$ | 0.014 | 0.021 | 0.002 | 0.020 | 0.011 | 0.008 | 0.006 |
| | Judgment | A | B | A | B | A | A | A |
| Redissolvability | | A | A | A | A | A | B | A |
| Dispersion stability | $D_{50}$[nm] | 102 | 115 | 138 | 93 | 110 | 132 | 92 |
| | Judgment | A | A | B | A | A | A | A |

As shown in Tables 7 to 9, the unadsorbed resin ratio of the ink (B-1) exceeded 52 mass %. The evaluation of the ejection stability of the ink (B-1) was poor.

The unadsorbed resin ratio of the ink (B-2) was less than 18 mass %. The evaluation of the abrasion resistance of the ink (B-2) was poor.

The predetermined sulfur concentration of the ink (B-3) was less than 1.0 ppm. The evaluation of the dispersion stability of the ink (B-3) was poor.

The predetermined sulfur concentration of the ink (B-4) exceeded 12.5 ppm. The predetermined phosphorus concentration of the ink (B-7) exceeded 12.5 ppm. The evaluation of the abrasion resistance of the ink (B-4) and the ejection stability of the ink (B-7) was poor.

The first absorbance of the ink (B-5) exceeded 0.010. The evaluation of the ejection stability of the ink (B-5) was poor.

The predetermined phosphorus concentration of the ink (B-6) was less than 1.0 ppm. The evaluation of the redissolvability of the ink (B-6) was poor.

The inks (A-1) to (A-12) had the following configurations. The unadsorbed resin ratio was 18 mass % or more and 52 mass % or less. The predetermined phosphorus concentration was 1.0 ppm or more and 12.5 ppm or less. The predetermined sulfur concentration was 1.0 ppm or more and 12.5 ppm or less. The first absorbance was 0.010 or less. The inks (A-1) to (A-12) had good ejection stability, abrasion resistance, redissolvability, and dispersion stability.

From the above, it can be judged that the ink satisfying the above-mentioned configuration has excellent ejection stability, is capable of forming images with excellent abrasion resistance, and has excellent redissolvability and excellent dispersion stability of the quinacridone pigment.

It should be understood by those skilled in the art that various modifications, combinations, sub-combinations and alterations may occur depending on design requirements and other factors insofar as they are within the scope of the appended claims or the equivalents thereof.

What is claimed is:

1. An inkjet ink, comprising:

a quinacridone pigment;

a pigment coating resin; and an aqueous medium, the pigment coating resin including an adsorbed resin that is adsorbed on the quinacridone pigment and an unadsorbed resin that is not adsorbed on the quinacridone pigment, a ratio of the unadsorbed resin to the pigment coating resin being 18 mass % or more and 52 mass % or less, a phosphorus concentration in a supernatant liquid being 1.0 ppm or more and 12.5 ppm or less, the supernatant liquid being obtained by centrifuging the inkjet ink at 1,050,000 G for 3 hours, a sulfur concentration in the supernatant liquid being 1.0 ppm or more and 12.5 ppm or less, absorbance of a first peak in an ultraviolet-visible light absorption spectrum of a 25-fold diluted solution of the supernatant liquid being 0.010 or less, the first peak being a maximum peak in a wavelength range of 400 nm or more and 450 nm or less.

2. The inkjet ink according to claim 1, which includes a sulfur compound represented by the following formula (1)

(1)

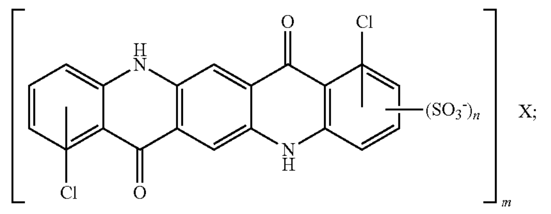

wherein, in the formula (1), n represents an integer of 1 or more and 3 or less, m represents an integer of 1 or more and 3 or less, and X represents a metal ion.

3. The inkjet ink according to claim 2, wherein

X in the formula (1) represents $Al^{3+}$ or $Mg^{2+}$.

4. The inkjet ink according to claim 2, wherein a ratio of a mass of the sulfur compound to a total mass of the quinacridone pigment and the sulfur compound is 4 mass % or more and 12 mass % or less.

5. The inkjet ink according to claim 1, further comprising a phosphorus-containing catalyst.

6. The inkjet ink according to claim 5, wherein the phosphorus-containing catalyst includes at least one of polyphosphoric acid or a polyphosphoric acid derivative.

7. The inkjet ink according to claim 1, wherein the pigment coating resin includes a repeating unit derived from (meth)acrylic acid, a repeating unit derived from (meth)acrylic acid alkylester, and a repeating unit derived from styrene.

8. The inkjet ink according to claim 1, wherein absorbance of a second peak in the ultraviolet-visible light absorption spectrum of the supernatant liquid is 0.15 or more and 0.40 or less, and the second peak is a maximum peak in a wavelength range of 300 nm or more and 350 nm or less.

9. An inkjet recording apparatus, comprising:

a conveying unit that conveys a recording medium; and a recording head that ejects an ink to the recording medium, the ink being the inkjet ink according to claim 1.

10. The inkjet recording apparatus according to claim 9, wherein the recording head is a line head.

* * * * *